(12) United States Patent
Gilson et al.

(10) Patent No.: US 12,413,820 B2
(45) Date of Patent: Sep. 9, 2025

(54) VIDEO DELIVERY

(71) Applicant: Comcast Cable Communications, LLC, Philadelphia, PA (US)

(72) Inventors: Ross Gilson, Philadelphia, PA (US); Michael Chen, Wallingford, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/327,933

(22) Filed: Jun. 2, 2023

(65) Prior Publication Data

US 2024/0007714 A1 Jan. 4, 2024

Related U.S. Application Data

(63) Continuation of application No. 17/564,928, filed on Dec. 29, 2021, now Pat. No. 11,711,588, which is a continuation of application No. 17/009,340, filed on Sep. 1, 2020, now Pat. No. 11,218,773, which is a continuation of application No. 15/852,569, filed on Dec. 22, 2017, now Pat. No. 10,798,455.

(51) Int. Cl.
| | |
|---|---|
| *H04N 21/4728* | (2011.01) |
| *G06F 3/01* | (2006.01) |
| *G06T 15/20* | (2011.01) |
| *H04L 65/611* | (2022.01) |
| *H04L 65/612* | (2022.01) |
| *H04L 65/70* | (2022.01) |
| *H04L 65/75* | (2022.01) |
| *H04L 67/02* | (2022.01) |
| *H04N 21/2343* | (2011.01) |
| *H04N 21/81* | (2011.01) |
| *H04N 23/698* | (2023.01) |

(52) U.S. Cl.
CPC ........ *H04N 21/4728* (2013.01); *G06F 3/012* (2013.01); *G06T 15/20* (2013.01); *H04L 65/611* (2022.05); *H04L 65/612* (2022.05); *H04L 65/70* (2022.05); *H04L 65/762* (2022.05); *H04L 67/02* (2013.01); *H04N 21/234327* (2013.01); *H04N 21/816* (2013.01); *H04N 23/698* (2023.01)

(58) Field of Classification Search
CPC ....... H04N 21/4728; H04N 21/234327; H04N 21/816; H04N 23/698; H04L 65/70; H04L 65/762; H04L 65/612; H04L 65/611; H04L 67/02; G06F 3/012; G06T 15/20
See application file for complete search history.

(56) References Cited

U.S. PATENT DOCUMENTS

| | | | |
|---|---|---|---|
| 6,510,177 B1 | 1/2003 | De Bonet et al. | |
| 7,613,344 B2 | 11/2009 | Kim et al. | |
| 8,903,568 B1 | 12/2014 | Wang et al. | |
| 8,929,446 B1 * | 1/2015 | Faroudja | H04N 19/14 375/240.13 |

(Continued)

FOREIGN PATENT DOCUMENTS

CN 111953983 A * 11/2020 ........... H04N 19/176

*Primary Examiner* — James R Sheleheda
(74) *Attorney, Agent, or Firm* — Banner & Witcoff, Ltd.

(57) ABSTRACT

The disclosure relates to a method of delivering a video frame. One implementation may involve spatially partitioning a video frame into a plurality of blocks, encoding at least one of the plurality of blocks of the video frame, and transmitting the at least one of the plurality of blocks of the video frame.

20 Claims, 20 Drawing Sheets

(56) References Cited

U.S. PATENT DOCUMENTS

| | | |
|---|---|---|
| 9,219,860 B1 | 12/2015 | Kozko |
| 9,232,257 B2 | 1/2016 | Gautier et al. |
| 9,332,285 B1 | 5/2016 | Grant et al. |
| 9,351,007 B1* | 5/2016 | Hobbs ................. H04N 19/102 |
| 9,720,497 B2 | 8/2017 | Jang et al. |
| 9,912,930 B2 | 3/2018 | Zustak et al. |
| 9,992,449 B1 | 6/2018 | Ashkenazi et al. |
| 10,062,414 B1 | 8/2018 | Westphal |
| 10,178,414 B2 | 1/2019 | Bhogal et al. |
| 10,484,701 B1 | 11/2019 | Wang et al. |
| 10,798,455 B2 | 10/2020 | Gilson et al. |
| 10,863,235 B2* | 12/2020 | Yip ...................... H04N 23/698 |
| 10,878,819 B1* | 12/2020 | Chavez ................. G10L 15/25 |
| 11,140,373 B2* | 10/2021 | Oh ....................... H04N 21/816 |
| 11,496,738 B1* | 11/2022 | Waggoner ............ H04N 19/124 |
| 2004/0010803 A1 | 1/2004 | Berstis |
| 2005/0243054 A1 | 11/2005 | Beymer et al. |
| 2008/0036875 A1 | 2/2008 | Jones et al. |
| 2009/0273711 A1* | 11/2009 | Chapdelaine .......... G11B 27/34 |
| | | 348/E7.001 |
| 2009/0300692 A1 | 12/2009 | Mavlankar et al. |
| 2010/0034425 A1* | 2/2010 | Lin ........................... G06T 7/20 |
| | | 382/103 |
| 2010/0232521 A1* | 9/2010 | Hagendorf ............. H04N 19/61 |
| | | 375/240.26 |
| 2010/0316119 A1* | 12/2010 | Mathew ............... H04N 19/124 |
| | | 375/240.03 |
| 2012/0092449 A1* | 4/2012 | Tourapis ................ H04N 19/30 |
| | | 348/E13.001 |
| 2012/0281139 A1* | 11/2012 | Zhang ..................... G06T 3/04 |
| | | 348/468 |
| 2013/0044996 A1* | 2/2013 | Bhogal .................... H04N 9/79 |
| | | 386/326 |
| 2013/0050183 A1 | 2/2013 | Wang |
| 2014/0176813 A1* | 6/2014 | Conness .......... H04N 21/42204 |
| | | 348/738 |
| 2014/0211681 A1 | 7/2014 | Chan et al. |
| 2014/0219367 A1* | 8/2014 | Faroudja ................ H04N 19/33 |
| | | 375/240.29 |
| 2014/0307780 A1* | 10/2014 | Cohen .................. H04N 19/119 |
| | | 375/240.03 |
| 2014/0321378 A1 | 10/2014 | Zhang et al. |
| 2015/0016504 A1 | 1/2015 | Auyeung et al. |
| 2015/0254870 A1 | 9/2015 | Knibbe et al. |
| 2015/0346832 A1 | 12/2015 | Cole et al. |
| 2016/0012855 A1 | 1/2016 | Krishnan |
| 2016/0165309 A1 | 6/2016 | Van Brandenburg et al. |
| 2016/0217760 A1 | 7/2016 | Chu et al. |
| 2016/0219267 A1 | 7/2016 | Chu et al. |
| 2016/0219325 A1 | 7/2016 | Chu et al. |
| 2016/0238841 A1 | 8/2016 | LaValle et al. |
| 2016/0261381 A1 | 9/2016 | Ko et al. |
| 2016/0277772 A1 | 9/2016 | Campbell et al. |
| 2016/0297522 A1 | 10/2016 | Brulez et al. |
| 2016/0357713 A1* | 12/2016 | Tocchini ............... G06T 11/001 |
| 2017/0003764 A1 | 1/2017 | Li |
| 2017/0018121 A1 | 1/2017 | Lawson et al. |
| 2017/0075416 A1 | 3/2017 | Armstrong |
| 2017/0085917 A1 | 3/2017 | Hannuksela |
| 2017/0115488 A1 | 4/2017 | Ambrus et al. |
| 2017/0118540 A1 | 4/2017 | Thomas et al. |
| 2017/0150230 A1 | 5/2017 | Shimura et al. |
| 2017/0200315 A1 | 7/2017 | Lockhart |
| 2017/0251176 A1 | 8/2017 | Smolyanskiy et al. |
| 2017/0251204 A1 | 8/2017 | Gupte et al. |
| 2017/0287220 A1 | 10/2017 | Khalid et al. |
| 2017/0289535 A1* | 10/2017 | Crispin ............. G02B 27/0179 |
| 2017/0310945 A1 | 10/2017 | Juang et al. |
| 2017/0316607 A1* | 11/2017 | Khalid ................. G02B 27/017 |
| 2017/0339415 A1 | 11/2017 | Wang et al. |
| 2017/0347084 A1 | 11/2017 | Boyce |
| 2017/0359586 A1 | 12/2017 | Xue et al. |
| 2017/0359596 A1 | 12/2017 | Kim et al. |
| 2018/0005447 A1* | 1/2018 | Wallner ................... G06T 15/04 |
| 2018/0005449 A1* | 1/2018 | Wallner ................. G06T 15/205 |
| 2018/0033176 A1* | 2/2018 | Su ........................ G06T 3/4038 |
| 2018/0047332 A1 | 2/2018 | Kuwahara et al. |
| 2018/0061454 A1 | 3/2018 | Herberger et al. |
| 2018/0077451 A1* | 3/2018 | Yip ...................... H04N 13/194 |
| 2018/0098077 A1 | 4/2018 | Skupin et al. |
| 2018/0115806 A1 | 4/2018 | Hwang et al. |
| 2018/0181119 A1 | 6/2018 | Lee et al. |
| 2018/0192001 A1 | 7/2018 | Boyce |
| 2018/0213202 A1 | 7/2018 | Kopeinigg et al. |
| 2018/0295400 A1 | 10/2018 | Thomas et al. |
| 2018/0302591 A1 | 10/2018 | Pio et al. |
| 2018/0309955 A1 | 10/2018 | Lawrence |
| 2018/0310010 A1 | 10/2018 | Hourunranta et al. |
| 2018/0322681 A1* | 11/2018 | Inomata ................ A63F 13/211 |
| 2018/0332265 A1* | 11/2018 | Hwang .............. H04N 21/8451 |
| 2018/0364803 A1 | 12/2018 | Khalid et al. |
| 2019/0253734 A1* | 8/2019 | Lee ....................... H04N 13/161 |
| 2019/0253743 A1* | 8/2019 | Tanaka ................. H04N 21/812 |
| 2020/0112712 A1* | 4/2020 | Koblin ............... H04N 21/4884 |
| 2020/0234499 A1* | 7/2020 | Hwang ................. G06T 19/006 |
| 2021/0014458 A1 | 1/2021 | Rajamanickam et al. |
| 2022/0108519 A1* | 4/2022 | Wang ...................... G06T 15/20 |
| 2022/0141547 A1* | 5/2022 | Plunkett, Jr. ........... G06V 20/48 |
| | | 725/139 |
| 2023/0412821 A1* | 12/2023 | Moro .................... H04N 19/176 |

\* cited by examiner

| Vertical index | | | | | | | | | | | | | | | | | | | | | |
|---|---|---|---|---|---|---|---|---|---|---|---|---|---|---|---|---|---|---|---|---|---|
| 8 | $R_{1,8}$ | $R_{2,8}$ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | $R_{20,8}$ | |
| 7 | $R_{1,7}$ | $R_{2,7}$ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | $R_{20,7}$ | |
| 6 | $R_{1,6}$ | $R_{2,6}$ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | $R_{20,6}$ | |
| 5 | $R_{1,5}$ | $R_{2,5}$ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | $R_{20,5}$ | |
| 4 | $R_{1,4}$ | $R_{3,4}$ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | $R_{20,4}$ | |
| 3 | $R_{1,3}$ | $R_{2,3}$ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | $R_{20,3}$ | |
| 2 | $R_{1,2}$ | $R_{2,2}$ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | $R_{20,2}$ | |
| 1 | $R_{1,1}$ | $R_{2,1}$ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | $R_{20,1}$ | |
| | 1 | 2 | 3 | 4 | 5 | 6 | 7 | 8 | 9 | 10 | 11 | 12 | 13 | 14 | 15 | 16 | 17 | 18 | 19 | 20 | Horizontal index |

| Vertical index | | | | | | | | | | | | | | | | | | | | | |
|---|---|---|---|---|---|---|---|---|---|---|---|---|---|---|---|---|---|---|---|---|---|
| 8 | $R_{1,8}$ | $R_{2,8}$ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | $R_{20,8}$ | |
| 7 | $R_{1,7}$ | $R_{2,7}$ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | $R_{20,7}$ | |
| 6 | $R_{1,6}$ | $R_{2,6}$ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | $R_{20,6}$ | |
| 5 | $R_{1,5}$ | $R_{2,5}$ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | $R_{20,5}$ | |
| 4 | $R_{1,4}$ | $R_{3,4}$ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | $R_{20,4}$ | |
| 3 | $R_{1,3}$ | $R_{2,3}$ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | $R_{20,3}$ | |
| 2 | $R_{1,2}$ | $R_{2,2}$ | ⋮ | ⋮ | ⋮ | ⋮ | ⋮ | ⋮ | ⋮ | Live From Comcast Sports | | | | ⋮ | ⋮ | ⋮ | ⋮ | ⋮ | ⋮ | $R_{20,2}$ | |
| 1 | $R_{1,1}$ | $R_{2,1}$ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | $R_{20,1}$ | |
| | 1 | 2 | 3 | 4 | 5 | 6 | 7 | 8 | 9 | 10 | 11 | 12 | 13 | 14 | 15 | 16 | 17 | 18 | 19 | 20 | Horizontal index |

$B_{i,j}$, $B'''_{i,j}$ or $B''''_{i,j}$

160

| $R_{9,2}$ | $R_{10,2}$ | $R_{11,2}$ | $R_{12,2}$ |
| $R'''_{9,2}$ | $R'''_{10,2}$ | $R'''_{11,2}$ | $R'''_{12,2}$ | or

| $R''''_{9,2}$ | $R''''_{10,2}$ | $R''''_{11,2}$ | $R''''_{12,2}$ |

VIDEO DELIVERY

CROSS-REFERENCE TO RELATED APPLICATIONS

This application is a continuation of and claims priority to U.S. patent application Ser. No. 17/564,928, filed Dec. 29, 2021, which is a continuation of U.S. patent application Ser. No. 17/009,340, filed Sep. 1, 2020 (now U.S. Pat. No. 11,218,773), which is a continuation of U.S. patent application Ser. No. 15/852,569 filed Dec. 22, 2017 (now U.S. Pat. No. 10,798,455), each of which is hereby incorporated by reference in its entirety.

BACKGROUND

Advances in data transmission technologies and in digital imaging have allowed video service providers to provide real-world visual experiences to users by delivering video content with large frame size and high resolution (or better quality). In comparison to delivery of video content having relatively smaller frame size, delivery of video content having increased frame size, e.g., 360 degree video content, may use greater bandwidth in order to maintain desirable resolution. However, it is expected that the transmission of video content with larger frame size and higher resolution will present new challenges in balancing network bandwidth usage with content quality, and there remains an ever-present need for improving the efficiency with which video content is delivered.

SUMMARY

The following summary is for illustrative purposes only, and is not intended to limit or constrain the detailed description.

Features described herein generally relate to the transmission of video, and to prioritizing transmission resources to emphasize areas of video that will be of most interest to a user. For example, some immersive videos have a 360-degree field of available video (e.g., captured using multiple cameras pointing in different directions, and/or using special lenses to capture wide angles of view), and during viewing, the user can look around, turn his head, move his eyes, rotate/move the camera, etc. to view different areas of the immersive video. In some embodiments herein, transmission resources may be prioritized to devote more resources to transmitting the portions of the video that are within the areas being viewed by the user, and fewer resources (or even no resources) to transmitting portions of the video that are outside of the user's field of view. For example, if the user is viewing a 360-degree video and is facing North, then more transmission resources may be devoted to transmitting the Northern view, and fewer (or no) resources may be devoted to transmitting the Southern view because that is behind the user's head and outside of the user's field of view.

Even within a particular field of view, the user's eyes may be focused on a particular area, and further resources may be devoted to transmitting the portion on which the user is focused. For example, the user may be facing North and seeing a Northern field of view, but his/her eyes may be focusing on a particular portion within that Northern field of view. This area of focus may be given greater transmission resources. For example, the entire Northern field of view may be transmitted at one video resolution via a first stream, and a separate data stream (e.g., an "enhancement layer") may be transmitted to carry additional video information pertaining to the area of focus, to enhance that focus area. The enhancement layer may, for example, carry additional video information to support greater pixel density for the area of focus (e.g., by carrying video data for pixels in between the pixels in the first stream) and/or greater color depth (e.g., by carrying additional color values to allow the pixels in the area of focus to have a greater range of colors) than for other areas in the Northern field of view.

A video frame of the 360-degree video described above may be divided into, for example, a plurality of graphical blocks or regions, and the blocks may be handled as noted above. For example, the blocks within the Northern field of view may be transmitted at one resolution, and an enhancement layer may be used to carry additional visual information for the particular blocks, within that Northern field of view, on which the user's eyes are focused.

The graphical blocks or regions discussed above may be any portion of the video frame. For example, the blocks could be squares resulting from dividing the frame into a grid. As another example, the blocks could be based on visual objects in the frame. For example, if pixels in one area of a frame have a common color, common brightness, are associated with a common audio level, are moving together, etc., or are otherwise identifiable as an object such as a car or a person, then that visual object may be treated as a block or region as described herein.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIG. 8 illustrates an example of encoding each block of a partitioned video frame independently from other blocks according to one or more illustrative aspects of the disclosure.

FIG. 9 illustrates an example of encoding a video frame in which an event occurs in the video frame according to one or more illustrative aspects of the disclosure.

FIG. 14 illustrates an example of data that may be used for non-video content associated with a video frame according to one or more illustrative aspects of the disclosure.

FIG. 15 illustrates an example of delivering embedded closed captioning content associated with a video frame according to one or more illustrative aspects of the disclosure.

FIG. 16 illustrates an example of delivering non-embedded closed captioning content associated with a video frame according to one or more illustrative aspects of the disclosure.

DETAILED DESCRIPTION

In the following description of various illustrative features, reference is made to the accompanying drawings, which form a part hereof, and in which is shown, by way of illustration, various features in which aspects of the disclosure may be practiced. It is to be understood that other features may be utilized, and structural and functional modifications may be made, without departing from the scope of the present disclosure.

Figure 1:
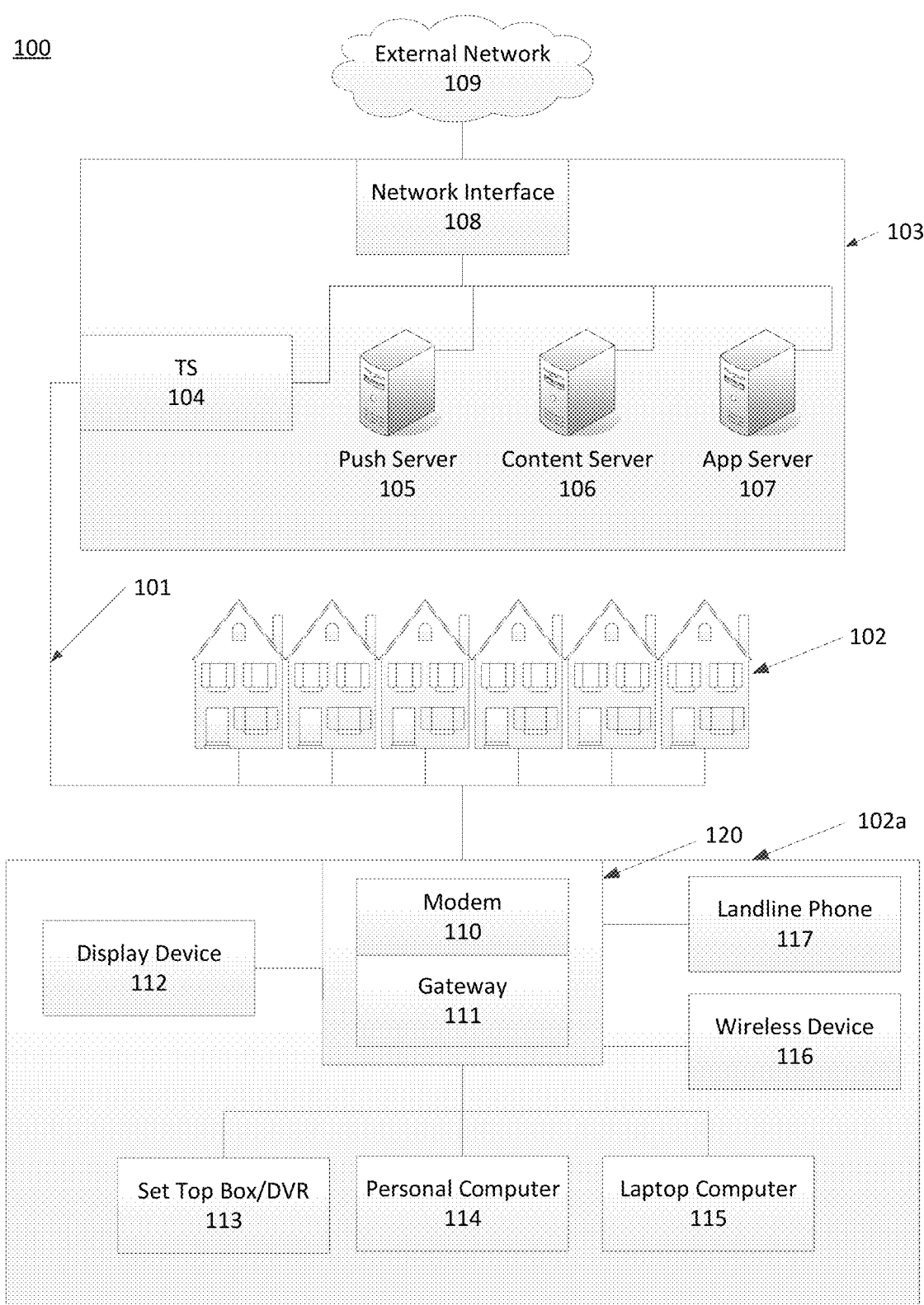
FIG. 1 illustrates an example communication network on which many of the various features described herein may be implemented.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream signals onto the links 101, and each premises 102 may have a receiver to receive and process those signals.

There may be one link 101 originating from the local office 103, and it may be split a number of times to distribute the signals to various premises 102 in the vicinity (which may be many miles) of the local office 103. The links 101 may include components not illustrated, such as splitters, filters, amplifiers, etc. to facilitate clear convey of the signals, but in general each split introduces a bit of signal degradation. Some portions of the links 101 may also be implemented with fiber-optic cable, while other portions may be implemented with coaxial cable, other lines, or wireless communication paths.

The local office 103 may include an interface, such as a termination system (TS) 104. More specifically, the termination system 104 may be a cable modem termination system (CMTS), which may be a computing device configured to manage communications between devices on the network of links 101 and backend devices such as servers 105-107 (to be discussed further below). The termination system 104 may be as specified in a standard, such as the Data Over Cable Service Interface Specification (DOCSIS) standard, published by Cable Television Laboratories, Inc. (a.k.a. CableLabs), or it may be a similar or modified device instead. The termination system 104 may be configured to place data on one or more downstream frequencies to be received by modems at the various premises 102, and to receive upstream signals from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, 360 degree video streams, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

Video content generally refers to information displayed (or displayable) to a user in the form of one or more images. Video content may have associated audio content, e.g., information presented (or presentable) to a user in audio form. Video content may have associated closed captioning content. Video content can be communicated or stored in the form of data. Video content data providing a digital representation of a particular video content can be created using any of various encoding techniques. Such encoding techniques include, but are not limited to, compression according to a Motion Picture Experts Group (MPEG) standard (e.g., MPEG-2), compression according to the ITU-T H.264 (ISO/IEC MPEG-4) advanced video coding (AVC) standard, etc. Video content data may be included in a single data stream that also includes associated audio content, or associated audio content may be carried in a stream separated from an audio stream. A video content data stream can be transmitted via the communication network 100, by modulating some type of signal (e.g., an optical signal, an RF carrier signal, an electrical signal carried over a twisted pair) that is communicated over some type of medium (e.g., optical fiber, coaxial cable, twisted pair conductor, free space, etc.) using one or more of various types of communication protocols (e.g., internet protocol). The received signal may then be processed by the premise 102a to extract the video content data stream and be displayed by the display device 112 of the premise 102a. In addition to demodulating the received signal, such extraction may include demultiplexing by isolating a signal carried on a particular optical wavelength or RF frequency from signals on other wavelengths or frequencies, by isolating certain data segments from other data segments, and/or by other types of demultiplexing techniques. Once the data stream has been extracted, data from that stream can then be decoded and used to generate appropriate electrical signals. Those electrical signals can then be output to a display device, for example, by the aforementioned display device 112, so as to cause the display device to present the video content on a display screen. Video content data can also be stored in some type of storage device (e.g., a magnetic disk drive) and then later retrieved for decoding and presentation in a similar manner.

Video content may be composed of more than one video frames each including a raster of pixels. During delivery of the video content, each video frame is delivered to a user device in a predetermined order. In some examples, each video frame may be spatially partitioned and encoded before being transmitted to a user device or multiple user devices. The user device may be implemented with any of numerous types of devices, including but not limited to, display devices 112 (e.g., VR (virtual reality) headset, television, high definition television (HDTV), host viewing device, monitor, game playing device, etc.), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. It should be understood that the user device may be any type of electronic device that may display the video content. In reference to FIG. 1, the local office 103 may further include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX, and COMET). For example, an application server may be responsible for collecting television program listings information and generating a data download for electronic program guide listings. In another example, the application server may be responsible for monitoring user viewing habits and for determining a user's area of focus during viewing of video content. In another example, the application server may spatially partition a video frame into a plurality of blocks, encode at least one of the blocks, and/or transmit all or a portion of the video frame to the premises 102. In another example, all or a portion of any one of methods of the present disclosure may be implemented on any of the push notification server 105, the content server 106, the application server 107, and other various servers or components, or on any combination of these servers. Although shown separately, one of ordinary skill in the art will appreciate that the push notification server 105, the content server 106, and the application server 107 may be combined. Further, here the push notification server 105, the content server 106, and the application server 107 are shown generally, and it will be understood that they may each contain memory storing computer executable instructions to cause a processor thereof to perform steps described herein and/or a storage for storing data. An exemplary premise 102a, such as a home, may include an interface 120. The interface 120 can include any communication circuitry needed to allow a device to communicate on one or more links 101 with other devices in the network 100. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway 111. The modem 110 may be connected to, or be a part of, the gateway 111. The gateway 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting user entities/devices in the premises 102a, such as display devices 112, additional STBs or DVRs 113, personal computers 114, laptop computers 115, wireless devices 116, landline phones 117, and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
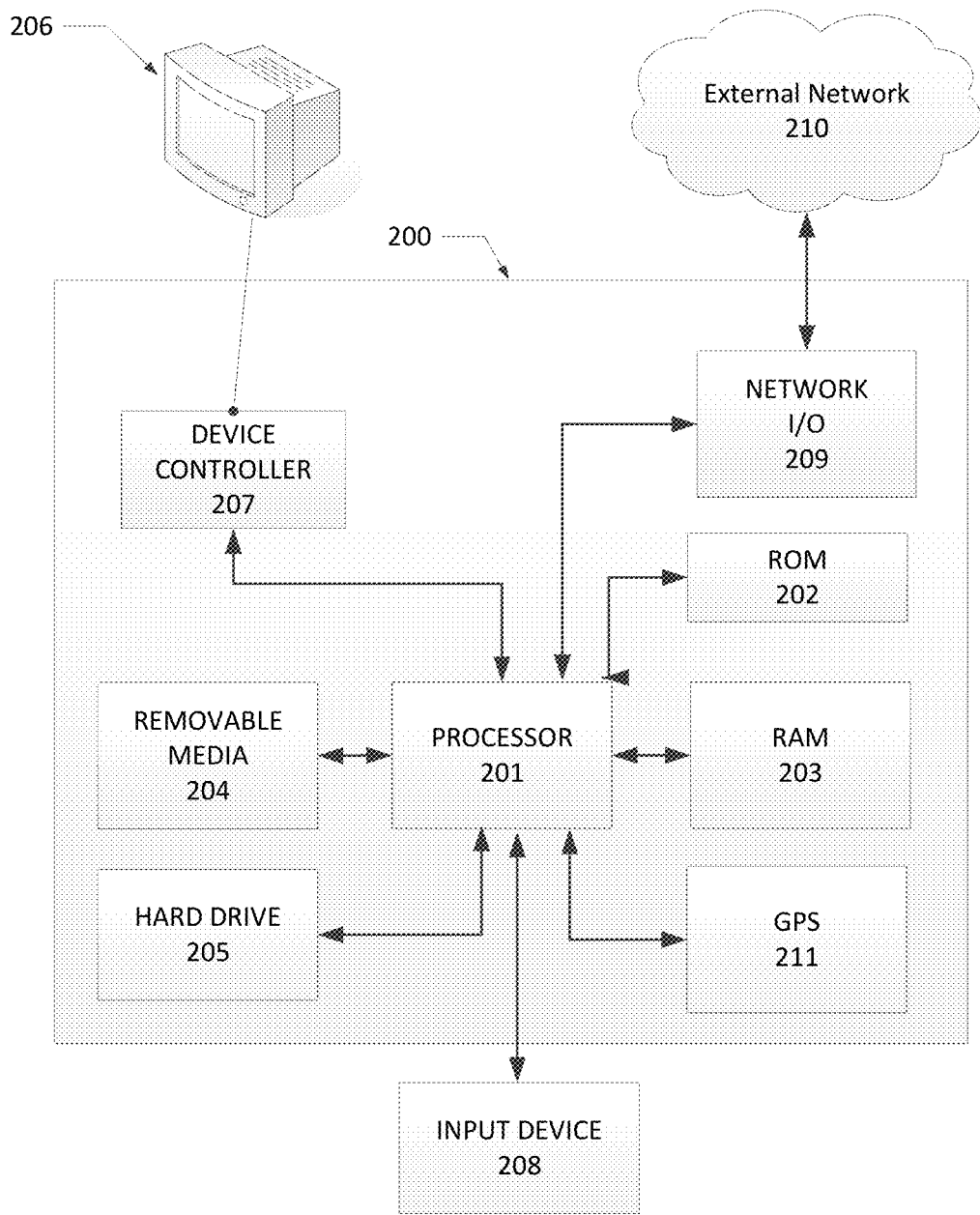
FIG. 2 illustrates an exemplary computing device that can be used to implement any of the methods described herein.

FIG. 2 illustrates an exemplary computing device that can be used to implement any of the methods described herein. It should be understood that servers, user devices, and other related components of the communication network mentioned in this disclosure may be computing devices implemented with all or a portion of the hardware elements of FIG. 2.

The computing device 200 may include one or more processors 201, which may execute instructions of a computer program to perform any of the features described herein. The instructions may be stored in any type of non-transitory computer-readable medium or memory, to configure the operation of the processor 201. For example, instructions may be stored in a read-only memory (ROM) 202, a random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include or be coupled to one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The example of FIG. 2 is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more non-transitory computer readable media such as a hard disk, optical disk, removable storage media, solid state memory, ROM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

One of ordinary skill in the art will appreciate that some components illustrated in FIG. 2 may be omitted in the computing device 200 according to design particulars. For example, when the computing device 200 is configured as a server, the GPS 211 may be omitted.

As mentioned above, some video content may offer more images beyond what a user is able to see, e.g., a field of view of a user. For example, in 360-degree video, the user may manipulate a camera (or turn his/her head, if using a virtual reality headset) to look at different areas in a 360-degree image. The 360-degree video may offer video at 60 frames per second, and delivery of such video content having such a frame size larger than a field of view of a user may require more efficient bandwidth allocation in order to balance network bandwidth usage with content quality. Hereinafter, delivery of video content having a frame size larger than a field of view of a user according to various embodiments will be described. The present disclosure, however, is not limited thereto. For example, video content having a frame size smaller than 360 degree video content can also be delivered according various embodiments of the present disclosure. The smaller size frames may include, for example, hemisphere video frames or quadrant video frames.

In one implementation, during creation of 360 degree video content, all directions of a view may be simultaneously recorded with, for example, omnidirectional cameras. An omnidirectional camera may cover a 360-degree horizontal plane or approximately an entire sphere. During playback of the 360 degree video content, a user may select which portion of the 360 video content the user wishes to view. A 360 degree video frame may be larger in size than a narrower angle video frame, because the 360 degree frame may comprise more information to be displayed in comparison with the narrower angle video frame. Thus, transmission of a 360 degree video frame may use more bandwidth than transmission of a narrower angle video frame.

To save bandwidth, a portion of, rather than an entirety of, the 360 degree video frame may be delivered to the user in the communication network, by, for example, the push notification server 105 and/or the content server 106 and/or application server 107 or other various servers or components described above with reference to FIG. 1. The present disclosure, however, is not limited thereto. In one implementation, a 360 degree video frame may be delivered to a user device during a predetermined period or when predetermined criteria are satisfied. These features will be further described with reference to FIGS. 3A through 18, described below.

Figure 3A:
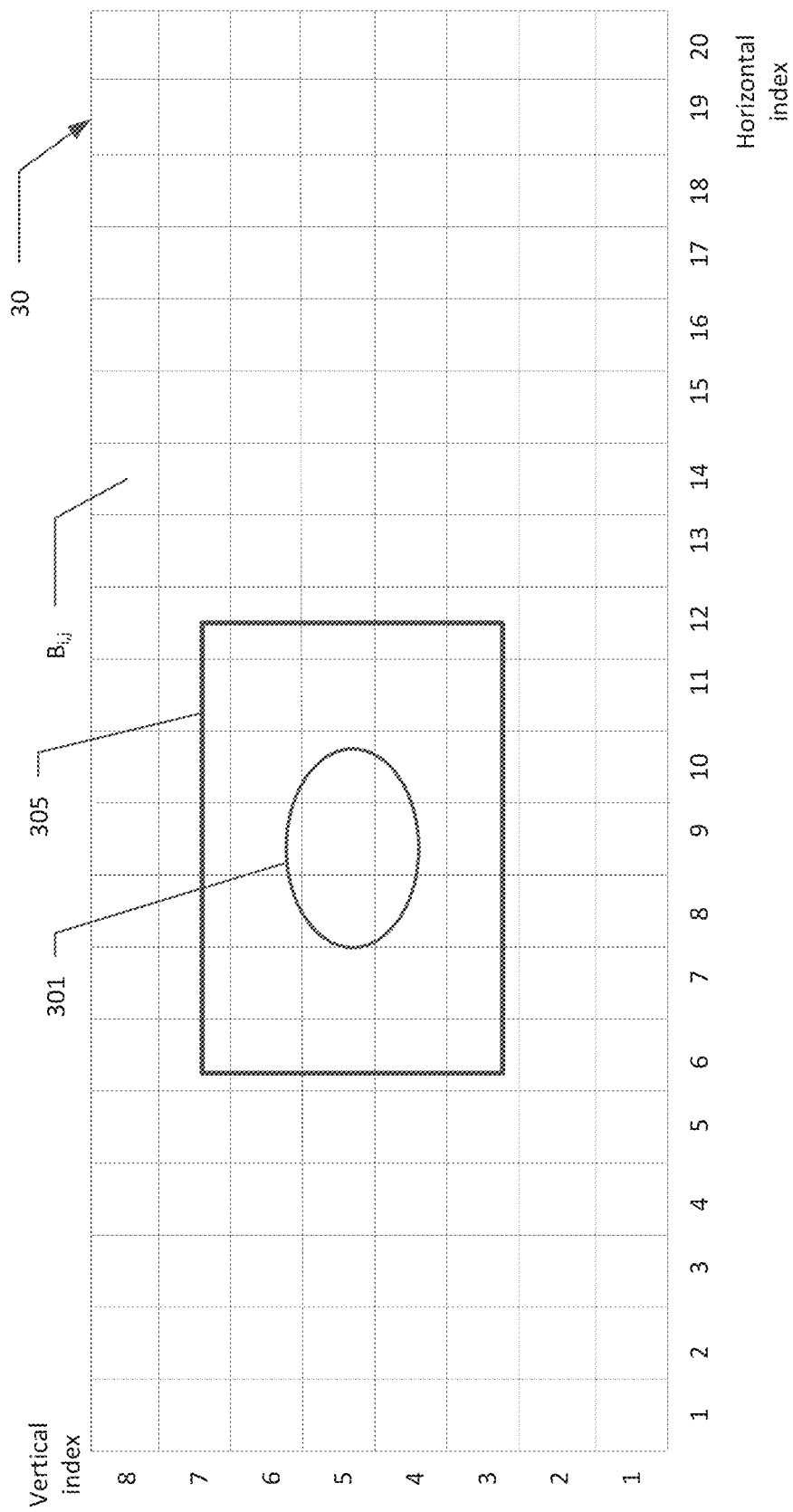
FIG. 3A illustrates an exemplary spatially partitioned video frame according to one or more illustrative aspects of the disclosure.

FIG. 3A illustrates an exemplary spatially-partitioned video frame 30 according to one or more illustrative aspects of the disclosure. The frame 30 shown in FIG. 3A is shown as a rectangle for ease of reference, but in a 360-degree video frame the actual image frame may appear as a sphere. FIG. 3A shows an exemplary two-dimensional (2-D) video frame, and an exemplary three-dimensional (3-D) video frame will be shown in FIG. 17 (which will be discussed later). The frame 30 may be divided into smaller portions, illustrated as blocks in FIG. 3A, for ease of processing as described herein. In the FIG. 3A example, the blocks may be identified by coordinates in the horizontal and vertical indices shown in the figure (e.g., $B_{i,j}$).

In one example embodiment, the 360 degree video frame 30 may be partially, rather than entirely, delivered to one or more user devices. This may conserve transmission and processing resources. As illustrated in FIG. 3A, the video frame 30 may be spatially partitioned into multiple blocks, for example the individual blocks $B_{i,j}$ shown in the FIG. 3A grid, by a server (as will be described later). Blocks of the video frame 30 may be encoded multiple times, each for a different transmission bitrate, and accordingly the blocks may comprise multi-bitrate (MBR) blocks. The higher bitrate versions may carry higher resolution versions of the block of the image. Higher resolution versions of blocks provide better quality for the block of the image. By having multiple versions of each block available, the server may choose a higher bitrate version of some blocks, and a lower bitrate version of other blocks, depending on, for example, what portion(s) of the video frame 30 the user's eyes are looking at or focusing on. Although described as being partitioned into MBR blocks, it should be understood that the video frame 30 may be partitioned into other suitable types of video blocks or combinations of types of video blocks. Also, the blocks in FIG. 3A are shown as quadrilaterals/squares, but in implementation the blocks may take on different shapes.

As mentioned above, the video frame 30 may be partitioned into a plurality of blocks $B_{i,j}$ each of which may contain one or more pixels. In some examples, the shape of the pixels may be square, and thus the shape of the block may be square. In some other examples, the shape of the pixels might not be square, and thus the shape of the blocks might not be square and might have curved edges. In still some other examples, the blocks may have different sizes for different areas of the video frame, and such examples will be further discussed later. In the example shown in FIG. 3A, the video frame 30 is evenly partitioned into 20×8 square blocks and each block $B_{i,j}$ can be identified by its corresponding horizontal index i and vertical index j. It should be understood that partitioning of a video frame can vary for different video frames and should not be limited to the particular example shown in FIG. 3A. For example, the video frame 30 may be spatially partitioned into different number of blocks and each block may have a shape the same as or different from each other. In some examples, the blocks may be in any polygonal shapes, e.g., rectangular or triangle, other than the square shape shown in FIG. 3A, or curved shapes, e.g., circular, oval, or in any other non-polygonal shapes. A shape of one block may be the same as or different from that of another block in the same video frame, and an area of one block may be the same as or different from that of another block in the same video frame. In one example, some regions may be encoded using smaller blocks than other regions, so that more data resources may be allocated to encode the some regions than the other regions.

Figure 3B:
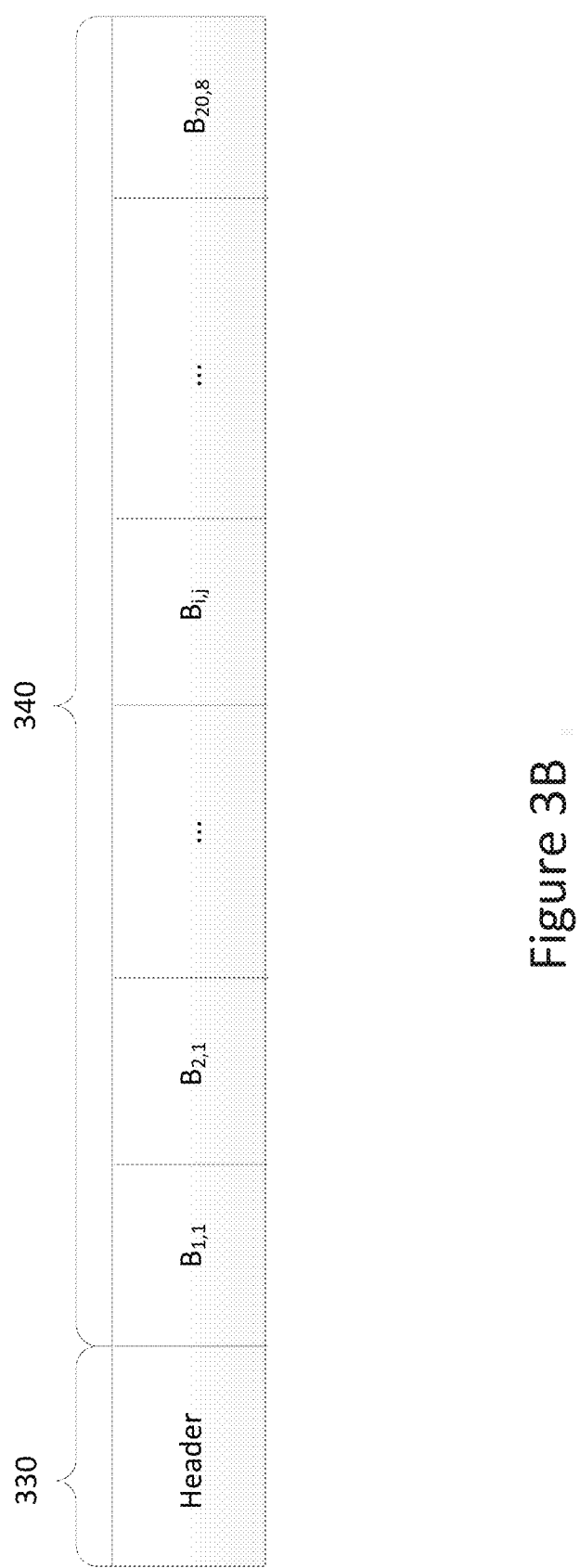
FIG. 3B illustrates an exemplary bitstream representation of a partitioned video frame according to one or more illustrative aspects of the disclosure.

FIG. 3B illustrates an exemplary bitstream of a partitioned video frame according to one or more illustrative aspects of the disclosure. For example, FIG. 3B may be a bitstream representation of the partitioned video frame of FIG. 3A. When blocks $B_{i,j}$ of the video frame 30 shown in FIG. 3A are encoded into a bitstream having MPEG-4 format, a header 330 may comprise information representing an address of each encoded block $B_{i,j}$ in images of the video frame, a size of each encoded blocks $B_{i,j}$, one or more designated bitrates for each encoded block $B_{i,j}$, and other parameters describing each encoded block $B_{i,j}$. A payload 340 of the bitstream may include data of all or a portion of the encoded blocks. In one implementation, one or more blocks that are determined to not to be viewed or requested might not be encoded or included within the bitstream. In this implementation, the payload 340 may comprise fewer blocks than if all blocks were transmitted. It should also be understood that the sequence of the encoded blocks in the payload 340 can be different from $B_{1,1}$, $B_{2,1}$, ... $B_{i,j}$, ...

$B_{20,8}$ as illustrated in FIG. 3B. It should also be understood that encoding the blocks $B_{i,j}$ into MPEG-4 is an example for explanation and the present disclosure should not be limited thereto. The blocks $B_{i,j}$ may be encoded into one or more other compressed formats.

Referring back to FIG. 3A, in one implementation, a portion of the video frame 30, such as a field of view 305 (as will be described later) of the video frame 30 may be selected by the server to be transmitted to the user device. In this implementation, the portion of the video frame 30 outside of the field of view 305 might not be transmitted to the user device. In the illustration of FIG. 3A, the blocks in the matrix $$\begin{matrix} B_{6,7} & \cdots & B_{12,7} \\ \vdots & \ddots & \vdots \\ B_{6,3} & \cdots & B_{12,3} \end{matrix}$$

are disposed within or overlap the boundary of the field of view 305, and thus may be associated with the field of view 305.

In one implementation, the server may transmit the encoded blocks associated with the field of view 305 to the user device, and not transmit other blocks to the user device. The blocks associated with the field of view 305 may comprise blocks completely within or partially within the field of view 305. In one example, the blocks associated with the field of view 305 may comprise blocks having boundaries that overlap the field of view 305. The user may only download and view the portion disposed within the field of view 305 at a given moment. Therefore, delivering the blocks associated with the field of view 305, without delivering the entire video frame to the user device, might not impair the view effect.

In one example, during a predetermined period or when predetermined criteria are satisfied, the server may transmit all of, rather than a portion of, the blocks to the user device or user devices. These features will be further described below with reference to FIG. 12.

The field of view 305 may represent the portion of the overall image that the user can see at a given moment in time. The field of view 305 may be dependent on one or more of the user's viewing angle, the degree of zoom, or the size of a screen of the user's display device (which may be determined by the manufacturer of the display device). For a certain type of display device, when the user's eyes are geometrically fixed relative to the display device at a given moment, the field of view may be determined at the given moment. For example, when a user wears a VR headset in a way that the VR headset does not move relative to the user's eyes, the field of view may be determined at a given moment based on the direction the user is looking. In some cases, the user may manually select or change the field of view by selecting areas that the user wishes to view, such as by entering navigational commands on a controller. If viewing on an interactive display, the user could tap on a different portion of the field of view to cause the field of view to re-center on the tapped point. In some cases, the user may voluntarily choose a smaller field of view 305 in order to minimize the amount of data that needs to be transmitted, so that the user may have fewer interruptions due to network delays. In some cases, the field of view 305 may be a field of view that is displayed to the user at a given moment, and the exact area may be determined by the user device by using eye tracking technology and data representing the exact area may be sent through upstream signals to switches and routers between the server and the user device, or directly to the server. The aforementioned techniques to determine the field of view can be combined or modified in consideration of user comfort or other design particulars.

In the cases where the data representing the area of the field of view is sent through upstream signals and is cached at the switches and routers, each switch/router may learn and determine the sum of the field of views of the users of the user devices that switch/router is serving. In such cases, the server may broadcast the entire video frame. When a switch/router determines that all of the user devices that the switch/router is serving are not viewing a block (e.g., block $B_{1,1}$), the switch/router can modify the data stream that is broadcasted from the server by dropping block $B_{1,1}$ from the data stream and send the modified data stream to the user devices that the switch/router is serving.

It should be understood that even though the server is used as an example in describing delivery of video frames to the user devices in the present disclosure, in some implementations, the switches and routers may perform some of the operations discussed in the present disclosure to realize the delivery of video frames.

In some examples, the field of view might not be dictated by the user, and instead could be determined by a source of the video, such that the user might not be able to see anything other than the field of view chosen by the source of the video. In this case, the field of view 305 may be selected and determined by a video editor. For example, in a video game where a user's character may look through a sight scope of a rifle, the video editor may black out the peripheral area of the video frame and confine the field of view within the central region of the video frame, thereby imitating the scope of the rifle. The video editor may be one or more people who produce or edit or reassemble the video content, or may be a computing device (which may be implemented with the computing device as shown in FIG. 2) configured to produce or edit or reassemble the video content. The video editor may a video editor, an officer operating the server, or personnel independent from the server. When the video editor is a computing device, the video editor may be a part of or an entirety of the server or a computing device independent of the server. In some cases, the video editor may black out certain areas of a video frame by tagging blocks comprising these certain areas as not to be transmitted and may confine the field of view 305 within a certain region of the video frame. In one implementation, if the field of view is determined by the video editor, metadata may be used to carry information, e.g., bitrate and resolution, representing the field of view for encoding, although the present disclosure is not limited thereto. In this implementation, there may be commands in the metadata to indicate that the video is a forced view and should be displayed regardless of the viewer's actual current viewing angle or camera position.

In some other cases, the user may use a mouse to manually select the smaller view on the screen have a smaller view than the size of the screen.

The user can change the field of view by turning his/her head to look at a different part of the immersive video. The user can use a mouse, joystick, or other controller to pan/tilt/move the point of view so that the field of view changes. The change of the field of view 305 may be detected by the user device, for example, the user device may detect, by using eye-tracking technology (as will be described later), a point in the image that is the focus of the user's eye gaze, and the user device may determine a field of view 305 around that point, having the point in the center of the field of view 305. In some cases, the field of view may change when the user moves closer to or farther away from the display screen, although the present disclosure is not limited thereto. Examples of changing field of view will be described below with reference to FIG. 6.

Even though in FIG. 3A the field of view 305 is shown to have a rectangular shape as an example, it should be understood that the shape of the field of view 305 is not limited thereto. Rather, the shape of the field of view 305 may be any shape. For example, as discussed previously, in a video game where a user's character may look through a sight scope of a rifle, the field of view may be round.

Still referring to FIG. 3A, the display may be presenting the user with the field of view 305, but the user's eyes might be focused on a smaller area 301 within that field of view. This smaller area 301, an area of focus, may comprise, for example, blocks in the matrix. Since a bandwidth for video delivery to a user device may be fixed within a certain period of time, e.g., 4 Megabits/second, to efficiently distribute the bandwidth for the video frame during the video delivery, the server may allocate a larger percentage (e.g., 70%) of the bandwidth for transmitting video content associated with the area of focus, and may allocate a smaller percentage of the bandwidth for transmitting video content other than video content associated with the area of focus. The example percentage 70% mentioned above may vary based on one or more of a degree to which other items of interest appear in that video frame outside the area of focus, or a likelihood of the user to view areas outside of the area of focus. The area of focus 301 is disposed at the center of field of view 305. As an example, the blocks in the matrix $$\begin{matrix} B_{8,6} & \cdots & B_{10,6} \\ \vdots & \ddots & \vdots \\ B_{8,4} & \cdots & B_{10,4} \end{matrix}$$

are disposed within or overlap the boundary of area of focus 301, and thus may comprise and be associated with the area of focus 301. The area of focus 301 may be at the center of the field of view 305 as illustrated in FIG. 3A if, for example, the user happens to be looking at the center of the display (and if the field of view is based on head-tracking, and not eye-tracking). Alternatively, in some circumstances, the area of focus 301 may be offset from the center of the field of view 305 if, for example, the user is looking at a corner of the display. Even though in FIG. 3A the area of focus 301 is illustrated as having an oval shape, it should be understood that the shape of the area of focus 301 is not limited to an oval. Rather, the shape of area of focus 301 may be any shape, and the area of focus 301 may be in any location.

In some embodiments, the area of focus 301 may be a region of interest where an event occurs. For example, the video editor may embed metadata in a video file to indicate locations in a video frame that should be given heightened attention (e.g., a movie director wants to make sure an explosion is delivered in high resolution regardless of whether the user's attention is focused on the exploding object). The region of interest may be automatically designated an area of focus 301 and treated accordingly.

Alternatively or in addition, the user may select the area of focus 301 by drawing a boundary or boundaries for a target area or multiple target areas on a touch screen.

Alternatively or in addition, eye tracking may be implemented to determine the area of focus 301 based on movements of the user's eyes. For example, an eye-tracking system can be used to determine a point in the field of view where the user is looking, and the system can select a region around that point to be the area of focus. Eye tracking is a process of measuring the area of focus by optical tracking.

Single or multiple users may watch the video displayed on the display screen of the single user device at the same time. In the case that only a single user watches the video frame, there may be only one area of focus, and the area of focus 301 may be selected by the user device or the user, or be determined by eye tracking. The server may receive information representing the selected or determined area of focus and use the information to encode blocks associated with the area of focus and then transmit the encoded blocks to the user device. In the case that multiple users watch the video frame on the display screen of the single user device at same time, there may be more than one area of focus since different users may focus on different areas of the video frame. Eye tracking may be used to identify the more than one area of focus.

In some cases, multiple users are watching a same video frame and the video frame may have an aggregate area of focus presenting a combination of areas of focus among the multiple users. Determining the aggregate area of focus may allow the system to prioritize the areas of focus to maximize the efficient use of total bandwidth for enhancing each of the areas that the viewers are focusing on. Among the multiple users, each user may have an area of focus that is the same as, or different from, an area of focus of another user. The aggregate area of focus may be a common area of focus among a substantial number of or all of the multiple users. The substantial number of users may refer to a number greater than a threshold number, for example, 20% (one-fifth) of the users. That is, when more than 20% of the users are focusing on a certain area, such as a group of blocks, then that area may be determined to be an aggregate area and the server may allocate more bandwidth to transmit blocks of the aggregate area so that the 10% of the users may obtain enhanced viewing experience. The server may allocate less bandwidth to transmit blocks of areas receiving attention of less than 20% of the users. In some examples, the threshold number indicated above may be smaller than 20%, for example, may be 10%. There are may be multiple aggregate areas of focus for one video frame. In one implementation, the common area of focus may be determined to be an area of focus common to a greatest portion of the user devices. More details of determining the aggregate area(s) of focus will be described in FIG. 13.

In the above cases where multiple users are watching a same video frame and the video frame has an aggregate area of focus, the server may transmit (e.g., via multicast transmission) a baseline layer of the entire video frame to a plurality of user devices, and transmit (e.g., via unicast transmission) a separate stream comprising enhancement layer data to enhance the respective user's area of focus. In the baseline layer, the blocks comprising the aggregate area of focus may have higher resolution than other blocks. When the blocks are MBR blocks, during the multicast transmission of the baseline layer, a respective higher bitrate version of each of the blocks comprising the aggregate area of focus may be selected and transmitted among its respective multiple bitrate versions. The enhancement layer may increase resolution of the respective user's area of focus. In the examples discussed previously where the blocks may have different sizes for different regions of the video frame, blocks comprising the field of view may be smaller than those outside of the field of view to allow finer grained control of which regions of the video frame to get higher bitrate MBR data.

In some examples when multiple users (e.g., two users) may be watching a same video, one of the users may allow the other user to control his field of view, and each user may independently have their own area of focus (within the same field of view controlled by the other user). The server may multicast (or broadcast) blocks comprising the field of view controlled by the other user to both users, and unicast a respective enhancement layer to each user device to enhance the respective area of focus of each user.

In some cases, the system can further help when there are multiple users. If there are too many users for enhancing each of the areas of focus to be feasible (e.g., if a nationwide broadcast of a live sporting event is watched by thousands), the system may try to prioritize the areas of focus to maximize the efficient use of the enhancement layer by predetermining the area of focus based on content of the video frame or based on audio content associated with the video frame. For example, when an event, e.g., a car explosion, occurs in the video frame, the video editor may determine that the user's attention is likely to be, or should be, attracted by flames of the car explosion; therefore, the video editor may predetermine that the blocks presenting the car explosion scene are the region of interest and are the area of focus. In the exemplary event of car explosion, the sound of car explosion may attract the user's attention and the user may turn his head towards the direction of the car explosion. The video editor may predetermine that the area of focus include video block(s) associated with the audio content of the car explosion.

In some cases, the system may determine the areas of focus of a subset of users who are viewing a video content currently being transmitted (e.g., a live sporting event broadcast, a television episode multicast, etc.), and can use that area of focus to determine what areas and enhancement layers should be sent for other users who are also viewing the video content. In such an implementation, those other users may receive the video content with a delay (e.g., 30 seconds) as compared to the users in the subset. The duration of the delay may depend on the amount of processing time needed for the system to collect and process the viewer information of the subset of users, and to prepare the necessary enhancement layers for the other users.

In some cases where the predetermined area of focus 301 is outside the current field of view, the user has to shift his field of view 305 so that the predetermined area of focus 301 falls within the new field of view.

In some cases, the video editor may embed metadata that provides information about the area of focus for one or more video frames in a video. For a computer-generated video frame, the video editor may determine the area of focus and may include metadata representing the area of focus in the video stream. Metadata may include block coordinates for corners of the focus area 301 or a listing of the blocks that comprise the focus area 301. Metadata may also include resolution preference for at least some regions of a video frame. For example, the video editor may prefer an area of focus to have a higher resolution than that of another area outside the area of focus in order to attract viewers' attention to the area of focus. Alternatively, the video editor may prefer an area of focus to have a lower resolution than that of another area outside the area of focus, to achieve a blurred effect. In some cases, field of view 305 can be represented in the metadata in the same way discussed above for the area of focus 301.

In some cases, the area of interest predetermined by the video editor may be overridden by the aggregate area of focus determined by statistical data collected from the multiple users. In some cases, the aggregate area of focus determined by statistical data collected from the multiple users may be overridden by the area of interest predetermined by the video editor.

In one example, the video editor may decide that area X should be given the focus, but if enough viewers are looking at area Y instead (e.g., instead of watching a hockey puck, the viewers are looking at a fight that has broken out on the ice at a different location), then the system may provide an enhancement layer for the area of the fight. This may be in addition to, or even instead of, the area predetermined by the video editor, and that may occur based on the volume of user viewing. For example, if area X is the predetermined area of focus, the system may decide to transmit an enhancement layer for area Y instead of (or in addition to) that of area X if some threshold quantity (e.g., 30%) of viewers are looking at area Y.

The opposite may also be true. In some cases, a video editor may decide to override what the users are actually looking at. For example, if a streaker runs onto a soccer pitch, the video editor may decide that, regardless of what percentage of viewers are looking at the streaker, the system will not provide enhancement layer data for the area containing the streaker. This overriding may occur, for example, dynamically in response to a video editor's command entered as the events of the program unfold.

In some examples, multiple user devices may receive the video frame 30 and one or more of the user devices may be digital video recorder (DVR) devices. When a user of a DVR device does not happen to be viewing a video frame when the DVR is recording, the server may infer a default area of focus, e.g., the aggregate area of focus determined based on all of the areas of focus of the other users, and deliver the video frame along with an enhancement layer applied to the aggregate area. When the user is watching a video frame and recording the video frame simultaneously, the content provider may deliver the video frame, along with an enhancement layer corresponding to the user's area of focus, to the digital video recorder for display and recording.

Information of field(s) of view and/or area(s) of focus may be used for delivering a subsequent video frame following the present video frame.

Figure 3C:
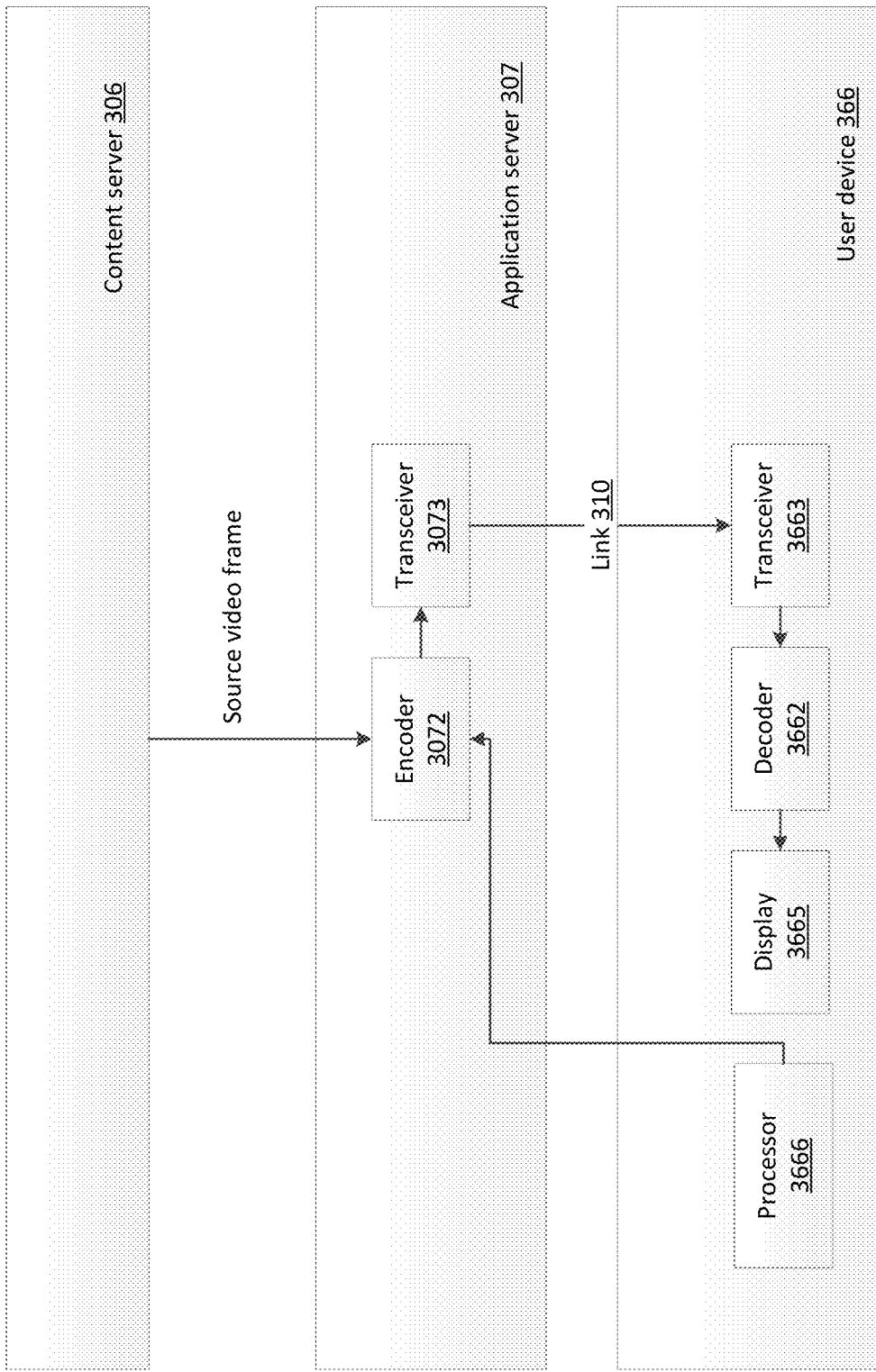
FIG. 3C illustrates an exemplary schematic diagram of a communication system which may be implemented to deliver a partitioned video frame according to one or more illustrative aspects of the disclosure.

The server described in FIG. 3C may be the push notification server 105 and/or the content server 106 and/or application server 107 or other various servers or components described above with reference to FIG. 1. The server may reside on a premise that is different from the premise(s) on which the user devices reside.

FIG. 3C illustrates an exemplary schematic diagram of a communication system that may be implemented to deliver a partitioned video frame according to one or more illustrative aspects of the disclosure. For example, the communication system of FIG. 3C may be used to deliver the partitioned video frame of FIG. 3A.

In FIG. 3C, a content server 306 may have similar structure and may perform similar functions as the content server 106 illustrated in FIG. 1. An application server 307 may have similar structure and may perform similar functions as the application server 107 illustrated in FIG. 1. A user device 366 may be a device configured to receive and/or display video content. For example, the device 366 may be a virtual reality headset, and a user may be watching a 360-degree movie while wearing the virtual reality headset, and may be viewing the movie on the headset's display. Although shown separately in FIG. 3C, all or a portion of the functions of the content server 306 and the application server 307 may be combined. Even though only one user device is illustrated in FIG. 3C, it should be understood that multiple user devices may be connected to the application server 307 by a link 310.

As shown in FIG. 3C, the content server 306 may transmit a source video frame to an encoder 3072 of the application server 307. The encoder 3072 may partition the received video frame into multiple blocks. In some cases, the encoder 3072 may partition the video frame into blocks (e.g., MBR blocks) having different shapes and difference sizes, and may group some discrete blocks into as an entirety for encoding. The encoder 3072 may encode the blocks each having multiple bitrate versions and stores the multiple bitrate versions of each block for transmission based on information representing a field of view (or fields of view) and an area of focus (or areas of focus) that may, for example, be determined by the user of the user device, by statistical data received by multiple users, or by the video editor without relying on the statistical data. The encoder 3072 may receive information representing field(s) of view and area(s) of focus from a processor 3666. For example, for the video frame 30 of FIG. 3A, the encoder 3072 may encode blocks associated with the field of view 305 for transmission to the user device using a first bitrate. In this example, the encoder might not encode all of the 20×8 blocks of the video frame 30, because the blocks associated with the field of view 305 may be sufficient to fill the user's view, and bandwidth may be saved by transmitting a portion of the blocks of the video frame 30. In some cases, the user's vision may degrade from the area of focus toward the areas outside the area of focus, and resolution requirement may drop from the area of focus toward the areas outside the area of focus. Thus, the encoder 3072 may encode the blocks associated with the area of focus 301 for transmission to the user device using a second bitrate that is higher than the first bitrate, and encode the blocks associated with the field of view 305 (expect for those blocks associated with the area of focus 301) for transmission to the user device using the first bitrate. As an alternative to encoding the blocks associated with the area of focus 301 using the higher second bitrate, the encoder 3072 may encode the field of view 305 using the first bitrate and apply an enhancement layer to increase resolution of the area of focus 301. The enhancement layer may be scalable video codec (SVC) enhancement layer for MPEG-4 standard. It should be understood that the enhancement layer is not limited to SVC enhancement layer and may be any suitable enhancement layer that can increase resolution of a target area of the video frame. Each block may be encoded independently from each other or may be encoded dependently with one or more blocks. The encoded blocks may be transmitted to one or more user devices by the server.

The encoder 3072 may transmit the encoded blocks to a transceiver 3073 of the application server 307. The transceiver 3073 may communicate with a transceiver 3663 of the user device 366 via the link 310 and may transmit the encoded blocks to the user device 366. Decoder 3662 of the user device 366 may receive and decode the encoded blocks, and may display the video frame with all or a portion of the decoded blocks on a display 3665.

In some cases, the encoder 3072 may encode each block in multiple resolutions (which may use different bitrates)

and transmit these versions to the transceiver 3073. Then, based on the field of view, the area of focus of the user of the user device 366, and/or an aggregate area of focus as previously discussed, the transceiver 3073 may select blocks to be transmitted to the user device 366.

Figure 4:
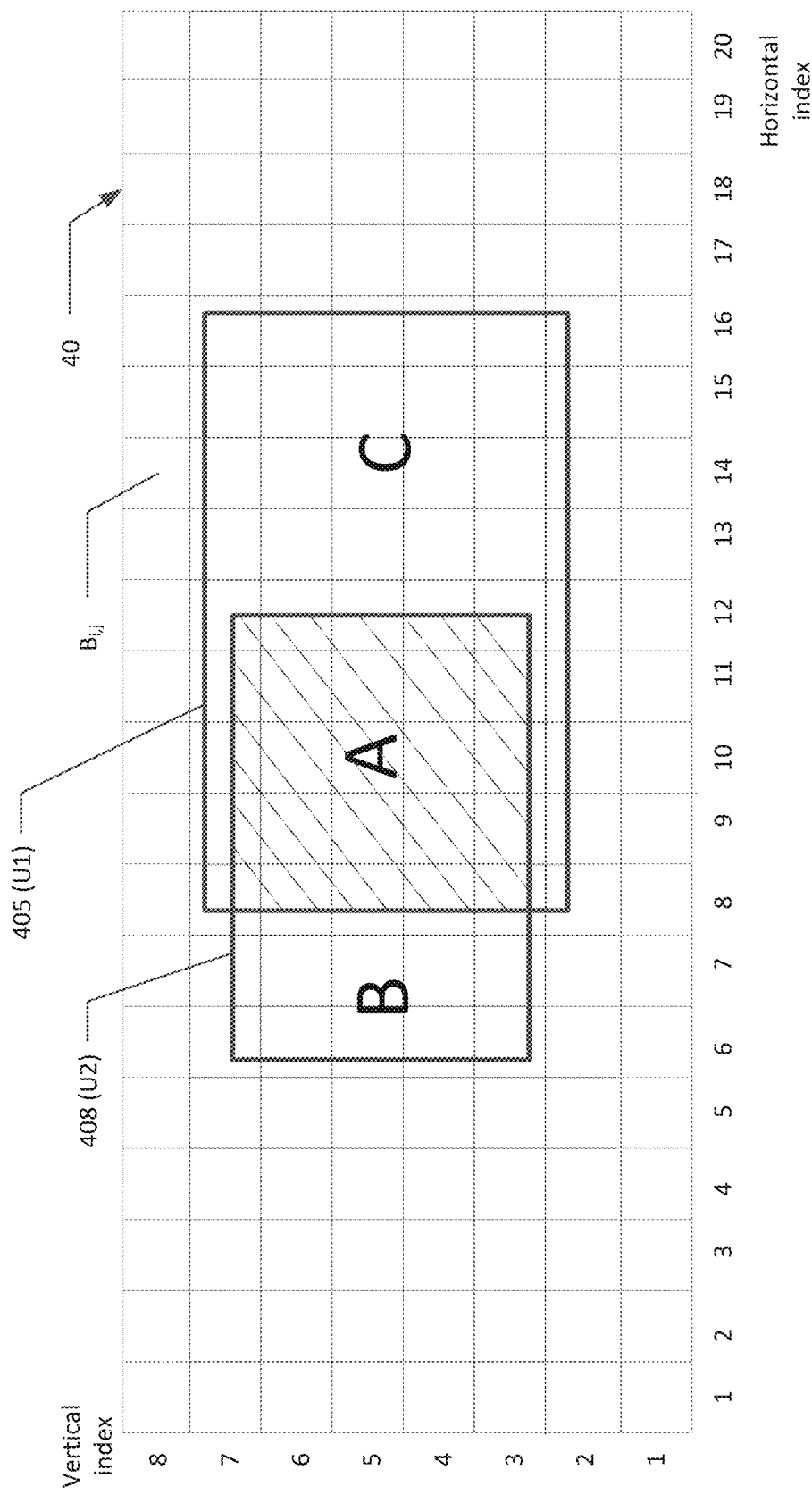
FIG. 4 illustrates an example of fields of view in a video frame according to one or more illustrative aspects of the disclosure.

In some cases where multiple user devices consume a video frame and users of the multiple user devices have overlapping fields of view, the server may multicast the overlapped portion (possibly with higher resolution) to the multiple user devices in order to improve transmission efficiency and optimize network bandwidth usage. FIG. 4 illustrates an example of fields of view in a video frame according to one or more illustrative aspects of the disclosure.

As shown in FIG. 4, more than one user device may view the video frame, and the fields of view of these user devices may have one or more overlapped area(s). The fields of view 405 and 408 of the first and second user devices U1 and U2 have an overlapped portion A (e.g., the shaded portion in FIG. 4). In one implementation, while starting separate unicast transmissions for the fields of view 405 and 408 of the first and second user devices U1 and U2, the server may provide a multicast stream that both devices U1 and U2 join, and may put the blocks comprising the overlapped area A and optionally the areas that are outside a combination of areas A, B, and C in the multicast stream. In this implementation, the server may unicast transmissions for the respective non-overlapping portions B and C of the respective fields of view to the respective user devices U1 and U2. Blocks associated with the overlapped portion A may refer to blocks disposed completely within the overlapped portion A, partially within the overlapped portion A, or combinations thereof. In one example, the blocks associated with the overlapped portion A may additionally include blocks of which the boundaries are overlapped with the boundary of the overlapped portion A even if the entirety of such blocks are outside the overlapped portion A. In this example, the server may determine the overlapped portion A as a common field of view which represents an area viewable to multiple users, and may apply an enhancement layer, e.g., an SVC enhancement layer, onto the overlapped portion A in order to increase resolution of the overlapped portion A.

In the example of FIG. 4, a field of view 405 of a video frame 40 for a first user device U1 is configured to be larger in size compared to a field of view 408 of the video frame 40 for a second user device U2. This may be due to user device U1 being physically larger than user device U2 such that it can fit more of the image on screen, or it may be due to the first user device U1 being zoomed in to the image a bit less than the second user device.

Even though fields of view 405 and 408, as shown in FIG. 4, partially overlap with each other, it should be understood that this is exemplary and that the fields of view 405 and 408 may be located differently with respect to each other. For example, the fields of view 405 and 408 may be spaced apart from each other, or the field of view 408 having a relatively smaller size may be disposed completely within the field of view 405.

In some implementations where different users may use display devices with different display capability, the server may deliver the video frame based on the different display capabilities. For example, the first user device U1 is a 16 k display and the second user device U2 is a 4 k display. The fields of view 405 and 408 of the users of the user devices U1 and U2 overlap as shown on FIG. 4. The server may either multicast (or broadcast) a baseline, which includes all blocks of the video frame 40, to the user devices U1 and U2; or multicast (or broadcast) a baseline, which includes blocks comprising regions A, B, and C but excludes blocks outside the combinations of regions A, B, and C. In case that the server multicasts a baseline, which includes all blocks of the video frame 40, to the user devices U1 and U2, the blocks outside the combination of the regions A, B, and C may have a lower resolution, for example, 1080 p. The server may multicast to the user devices U1 and U2 an enhancement layer that includes blocks comprising the overlapped portion A and increase the resolution of the overlapped portion A from 1080 p to 4 k. Thus, the multicast stream from the server may include the baseline including all blocks of the video frame 40 and the enhancement layer that includes blocks comprising the overlapped portion A. The server may unicast to the second user device U2 an enhancement layer that includes blocks comprising the portion B to increase the resolution of the portion B from 1080 p to 4 k. Thus, the unicast stream from the server to the second user device U2 includes the enhancement layer including blocks comprising the portion B. The server may unicast to the first user device U1 an enhancement layer that includes blocks comprising the region A and further increase the resolution of region A from 4 k to 16 k. The server may unicast to the first user device U1 an enhancement layer that includes blocks comprising the region C and increase the resolution of region C from 1080 p to 16 k. Thus, the unicast stream from the server to the first user device U1 includes the enhancement layer including blocks comprising the region A and the enhancement layer including blocks comprising the region C.

Figure 5:
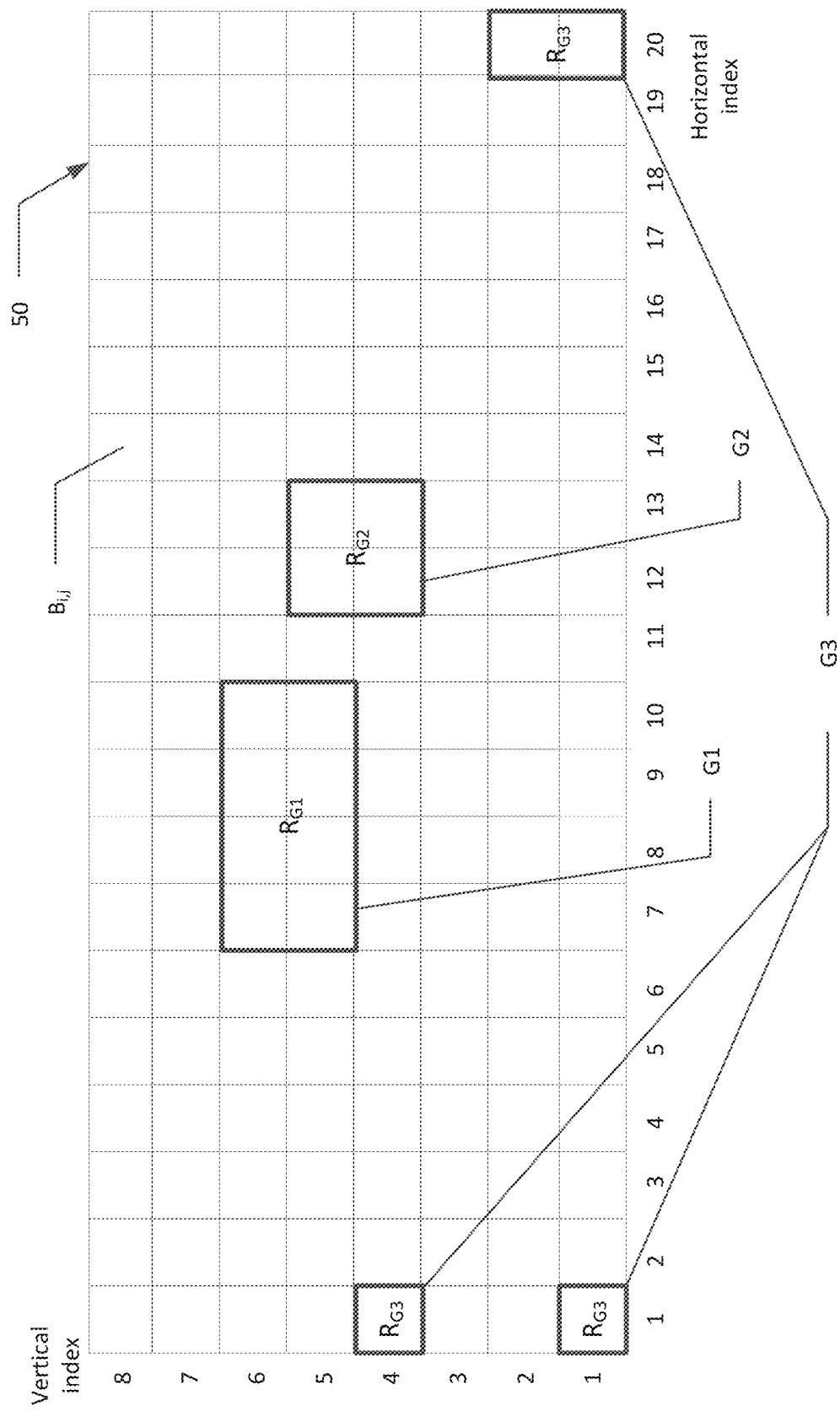
FIG. 5 illustrates an example in which blocks of a partitioned video frame are packaged as a group according to one or more illustrative aspects of the disclosure.

In some implementations, the server may package multiple blocks as a group to represent a certain object, for example, a building, and may encode and transmit the group as an entirety. For example, the server may encode one group of blocks in a same video file. This may simplify encoding and expedite transmission since multiple blocks may be encoded and transmitted together rather than individually. FIG. 5 illustrates an example in which blocks of a partitioned video frame are packaged as a group according to one or more illustrative aspects of the disclosure.

In the example of FIG. 5, the encoder 3072 may encode ungrouped blocks independently from each other. In a video frame 50, three different groups G1, G2, and G3 are packaged with their respective blocks. Even though only three groups are shown in FIG. 5, the number of groups may vary. For example, the number of groups may be determined by the video editor. Group G1 includes 8 blocks and may represent an object, e.g., a building. Group G2 includes 4 blocks and may represent another object, e.g., a tree. Group G3 includes 4 blocks, among which some blocks are discretely distributed, and may represent a discontinuous object. It should be understood that any number of blocks may be included in a group, and that all the blocks of the same group may represent a continuous region in the video frame or some blocks of one group may be in one region separated from another region represented by other blocks of the same one group.

The encoder 3072 may encode groups G1, G2, and G3 for transmission using bitrates $R_{G1}$, $R_{G2}$, and $R_{G3}$, respectively. As such, during the transmission of groups G1, G2, and G3, the data stream has different rates of conveying bits at different times. As an example, larger groups may be encoded for transmission using higher bitrates. As another example, a group disposed entirely or partially within the area of focus may be encoded for transmission using a higher bitrate. Still as another example, groups completely outside the area of focus may be encoded using lower bitrates. The shapes of the groups are not limited to those depicted in FIG. 5 and the groups may have any other shapes.

In some cases, the server may create a number of different resolution versions for each group of blocks and each ungrouped block, and each resolution version of each group and ungrouped block may be separately encoded in a certain type of compressed format, e.g., MPEG-4 format. As such, the server may reassemble groups of blocks and ungroup blocks, for transmission, with any of these resolution versions at a later point of time, based on the field of view and the area of focus.

Figure 6:
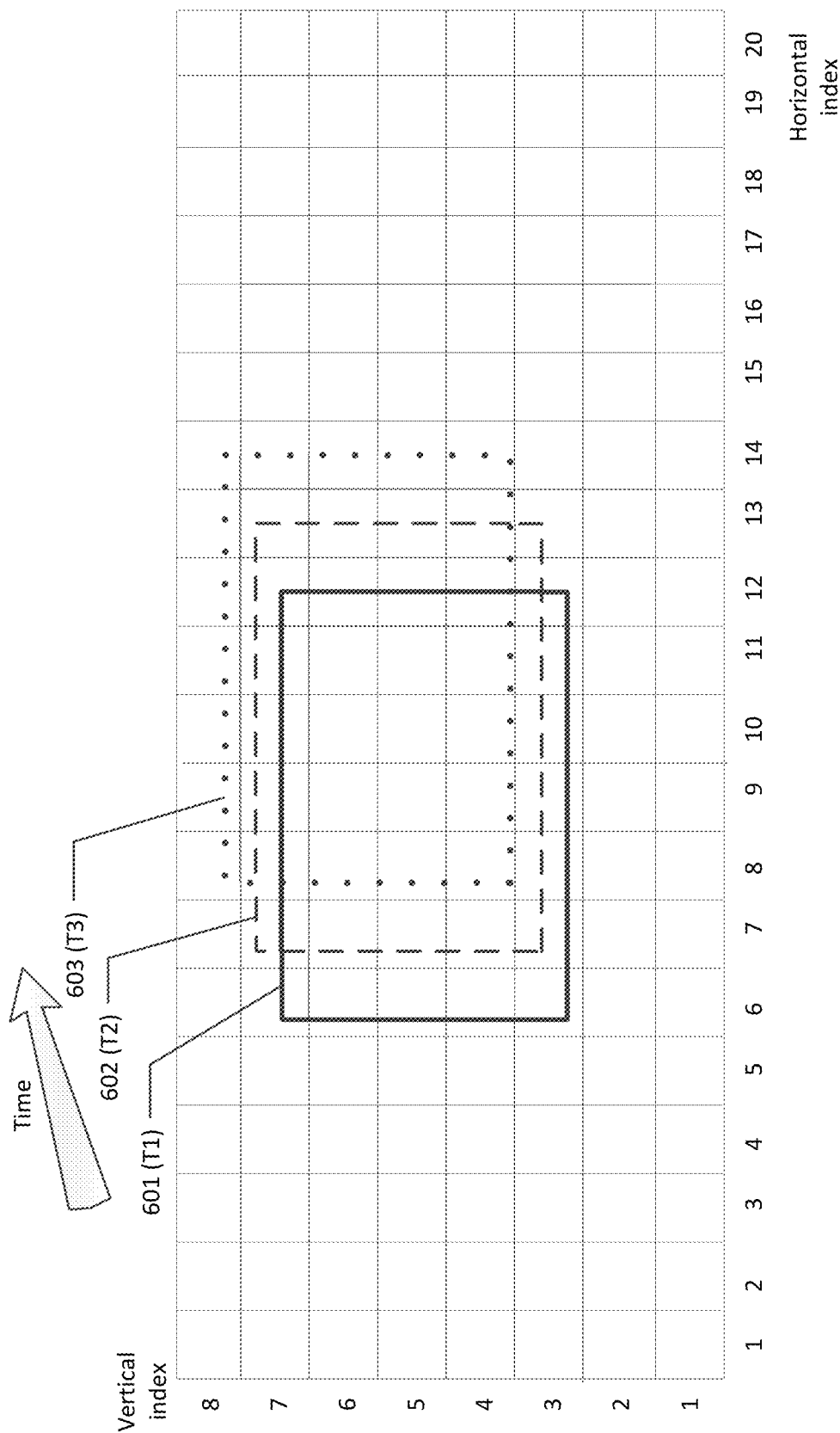
FIG. 6 illustrates an example in which a field of view in a video frame is changed for a user in a time period according to one or more illustrative aspects of the disclosure.

FIG. 6 illustrates an example in which a field of view in a video frame is changed for a user in a time period according to one or more illustrative aspects of the disclosure. In this example, when a user wearing a VR headset views a 360 degree video, the user turns his head or moves his eyes from one region to the upper right corner thereof during a time period from time T1 to T2 to T3. During the movement of the eyes, the field of view may change from 601 (T1) to 602 (T2) to 603 (T3), and a sequence of video frames and blocks associated with the field of view may change accordingly. The VR headset may update information representing the field of view and may send the updated information to the server. The server may use the updated information to determine one or more blocks associated with the current field of view, encode the one or more blocks for transmission, and transmit the one or more blocks to the VR headset. In some examples, when a user sits close enough to a television and watches a video, and the user moves eyes or turns his head, the field of view may change accordingly. It should be understood that the user device is not limited to a VR headset or a television, and may be any other display device or devices. In some examples, when the user turns his head, the server may identify a new set of blocks that are needed for display. In the case of a static image being viewed, the server may determine whether any needed blocks have already been received, determine additional blocks that should be included in a multicast stream with a lower-resolution for displaying images within the new field of view, and then issue unicast requests for enhancement layer versions of blocks comprising a new area of focus within the new field of view.

Figure 7:
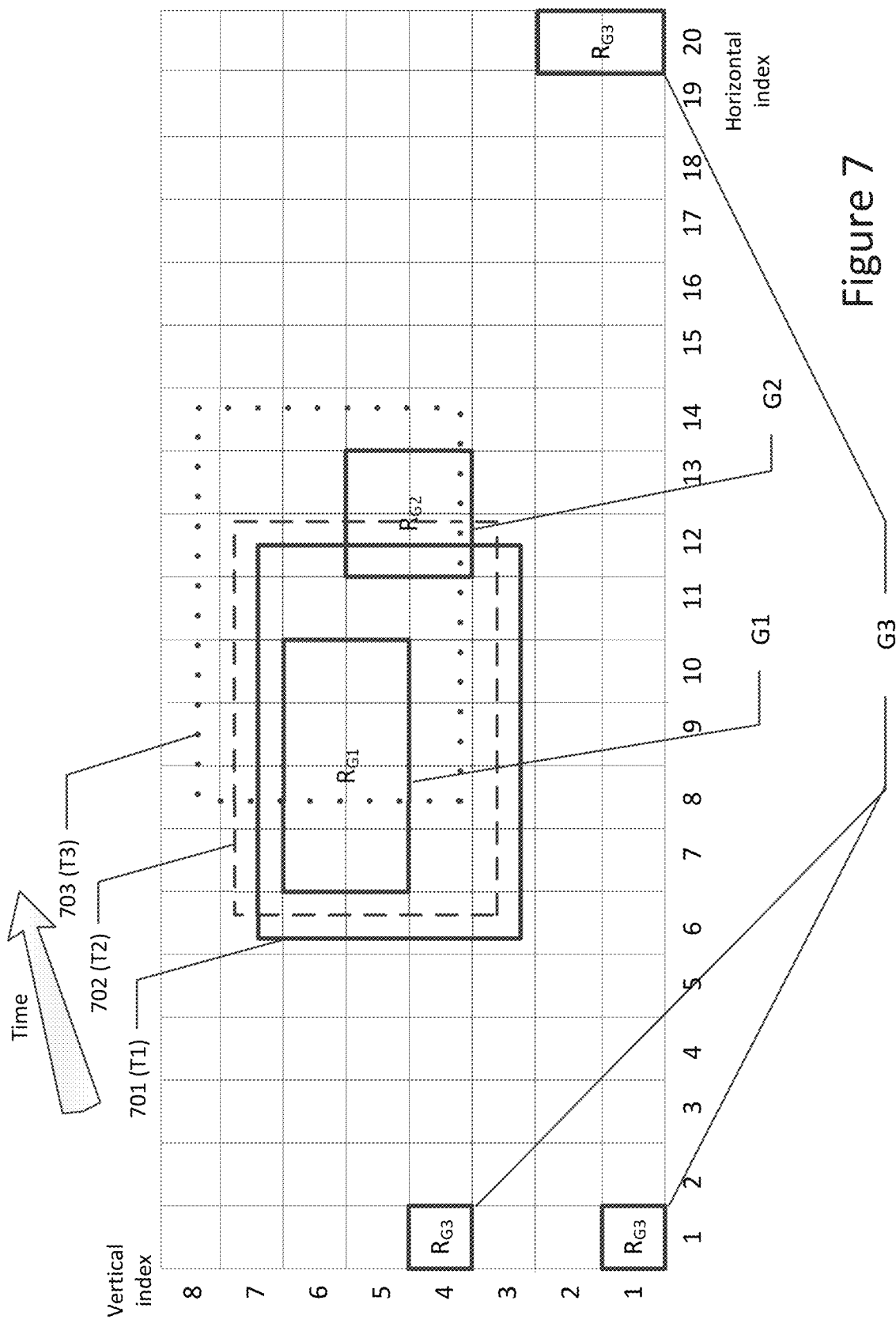
FIG. 7 illustrates an example of delivering groups of blocks when a field of view in a video frame is changed according to one or more illustrative aspects of the disclosure.

FIG. 7 illustrates an example of delivering groups of blocks when a field of view in a video frame is changed according to one or more illustrative aspects of the disclosure. When the field of view changes, blocks packaged as a group may be delivered to the user device even if some of blocks of the group might not be included in the field of view. For convenience of explanation, it is assumed that in FIG. 7, the relative position of each group in one video frame is the same as in subsequent video frames (in other words, the video remains the same from frame-to-frame in this example, and the only thing changing is the user's focus).

In reference to FIG. 7, the field of view of a user changes from 701 to 702 to 703 during the time period from time T1 to T2 to T3. The VR headset may update information representing the field of view and may send the updated information to the server. At time T2, even though blocks $B_{13,4}$ and $B_{13,5}$ of group G2 are not associated with the field of view 702, the server might continue to deliver all blocks of group G2 to the user device in consideration that blocks $B_{12,4}$ and $B_{12,5}$ of group G2 are still associated with the field of view 702. Similarly, at time point T3, the server may receive updated information and determines that blocks $B_{8,6}$ $B_{9,6}$ $B_{10,6}$ $B_{8,5}$ $B_{9,5}$ $B_{10,5}$ of group G1 are associated with the field of view 703. In response to a determination that at least one block of group G1 is associated with the field of view, the server may continue to deliver all blocks of group G1 to the user device. In the case that none of blocks of a group are associated with the field of view, the server may stop delivering the group as an entirety to the user device. In this circumstance, the user device may no longer get an enhancement layer previously applied for this group, and the user device would resort to displaying the low-resolution multicast version of the blocks in this group. The server may encode each group independently from each other. That is, group G1 may be encoded for transmission using bitrate $R_{G1}$, group G2 may be encoded for transmission using bitrate $R_{G2}$, and group G3 may be encoded for transmission using bitrate $R_{G3}$. Bitrate $R_{G1}$, bitrate $R_{G2}$, and bitrate $R_{G3}$ may be the same as or different from each other. One of ordinary skill in the art would recognize that the ungrouped blocks may be encoded independently from each other and independently from any grouped blocks.

FIG. 8 illustrates an example of encoding each block of a partitioned video frame independently from other blocks according to one or more illustrative aspects of the disclosure. The server may selectively transmit any one of the encoded blocks at a respective predetermined bitrate. Referring to FIG. 8, each block $B_{i,j}$ of a video frame 80 is encoded independently from the other blocks. Each block $B_{i,j}$ may be encoded for transmission using a respective bitrate $R_{i,j}$. A bitrate may be selected for one block, with or without consideration of the bitrate of its neighboring blocks. In some cases, each block may be encoded as an individual video file. In one implementation, the server may create a number of different versions for each block and each version of each block may be separately encoded in a certain type of compressed format, e.g., MPEG-4 format. In this implementation, one version of a block may have a bitrate different from another version of the block.

In some cases, the server may create a number of different versions for each group of blocks and each ungrouped block, and each version of each group and ungrouped block may be separately encoded in a certain type of compressed format, e.g., MPEG-4 format. The video editor may reassemble groups of blocks and ungroup blocks with any of the available versions at a later point of time.

Figure 9:
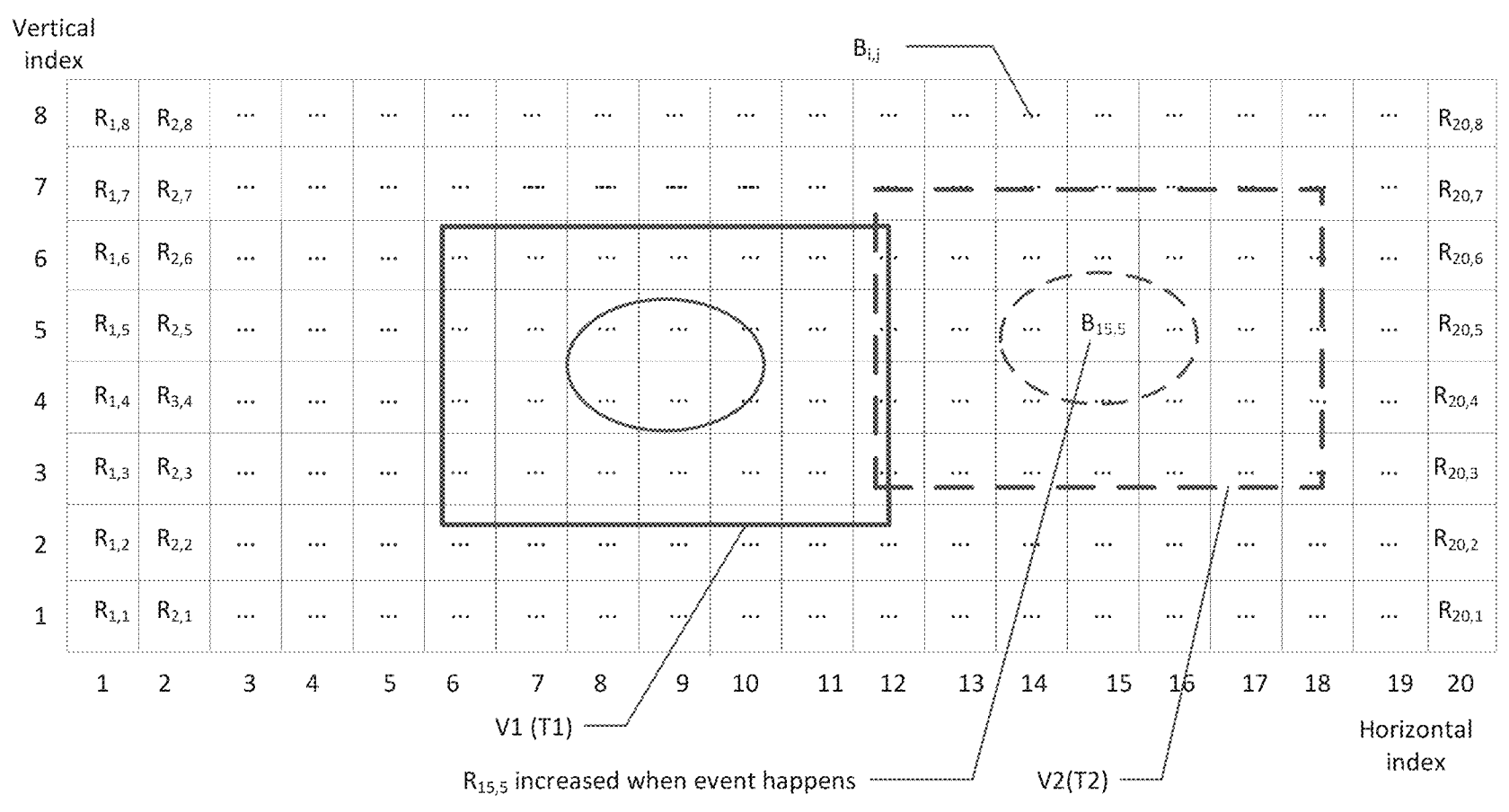

FIG. 9 illustrates an example of encoding a video frame in which an event occurs according to one or more illustrative aspects of the disclosure. For convenience of explanation, in FIG. 9, video frames are partitioned in the same manner as each other, although the present disclosure is not limited thereto. In this example, at time T1, a user using a VR headset may view images within a field of view V1 with an area of focus at a central portion of the field of view V1. At time T2, an event (e.g., a car explosion) may occur at block $B_{15,5}$. The car explosion may attract the attention of the user, and the user may respond by moving their areas of focus onto block $B_{15,5}$ and its peripheral (or neighboring) blocks. The field of view of the user may shift from V1 to V2 accordingly. The user device may update the information presenting the field of view and the area of focus (e.g., an updated list of blocks of the field of view and an updated list of blocks of the area of focus, or simply an updated list of coordinates indicating where the user is looking, if the field of view and area of focus are processed based on where the user is looking), and may send the updated information to the server. The server may determine whether the user will be still looking at block $B_{15,5}$ in the next video frame. If it is determined that the user will be still looking at block $B_{15,5}$, the server may select a higher bitrate version, than that of the previous video frame, among the stored multiple bitrate versions for transmission in order to provide a better resolution for $B_{15,5}$. In some examples, compared to the bitrates of other blocks of the previous video frame that have same indices, bitrates of the respective other blocks may be either maintained or decreased so that resolution of the other blocks is lower than the resolution of $B_{15,5}$. The server may deliver blocks associated with the field of view V2 to the user device. Even though in this example, the car explosion event is confined within one block, it should be understood that an event may expand into more than one block.

Figure 10:
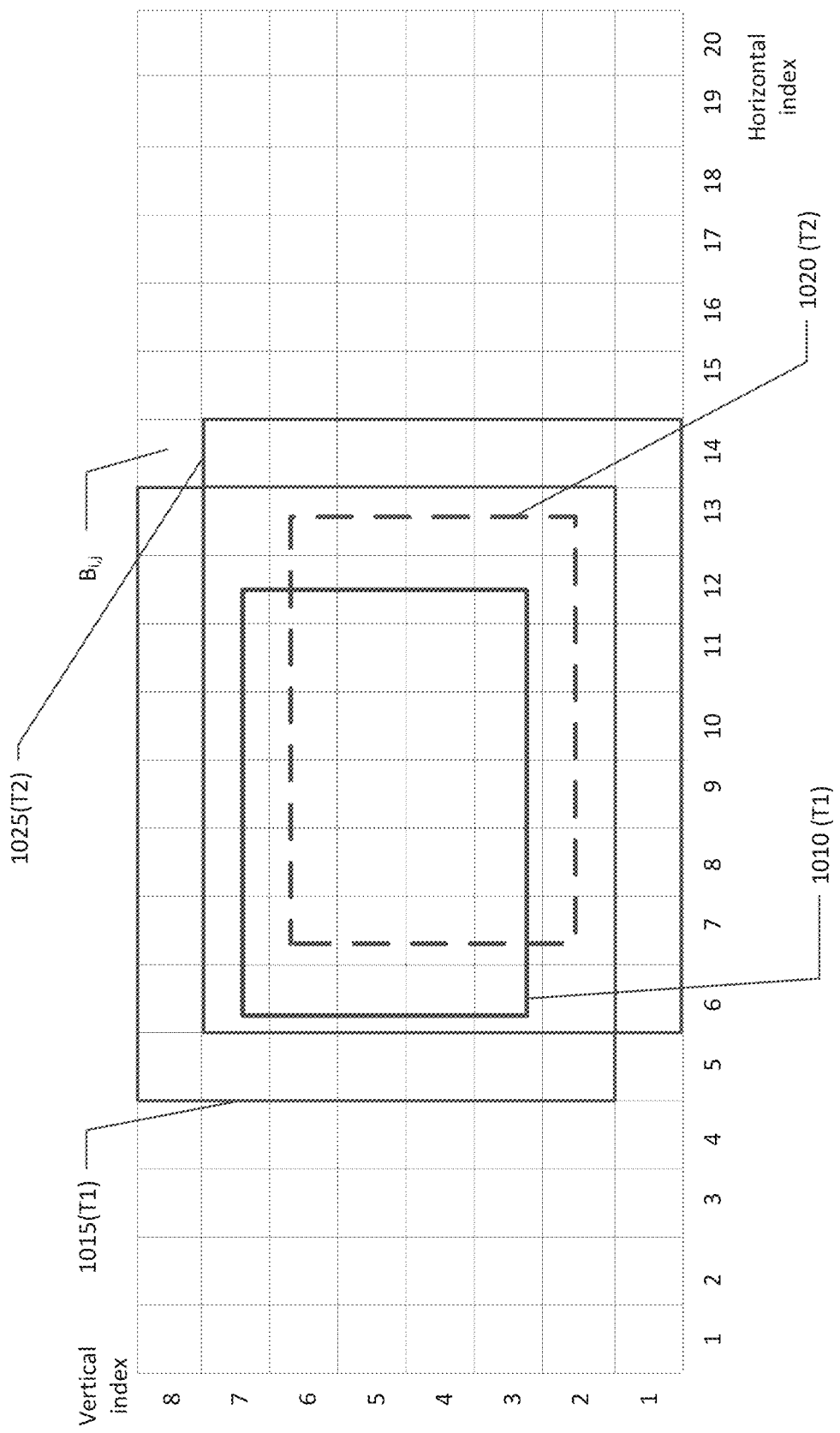
FIG. 10 illustrates an example of partial delivery of a partitioned video frame according to one or more illustrative aspects of the disclosure.

In order to account for anticipated movement by the user, the system can transmit slightly more than just the blocks in the field of view 305. That way, if the user moves his/her head a little, the neighboring blocks will already have been provided and may be quickly displayed. To solve such problem, while transmitting two successive video frames, especially those having substantially same content with only small different details, the server may transmit additional column(s) and/or row(s) surrounding the field of view to the user device. An example of these cases will be described in FIG. 10. FIG. 10 illustrates an example of delivery of a partitioned video frame according to one or more illustrative aspects of the disclosure. Extent of the coverage of additional blocks as discussed above may depend on motion estimation and/or other empirically available characteristics. For example, for videos of some sport games which have larger variation horizontally but less vertically, the number of additional columns of blocks may be greater than the number of additional rows of blocks.

In the example of FIG. 10, when a user wearing, for example, a VR headset turns their head, the field of view changes from 1010 to 1020 from time T1 to time T2. At time T1, in addition to delivery of blocks $$B_{6,7} \quad \ldots \quad B_{12,7}$$
$$\vdots \quad \ddots \quad \vdots$$
$$B_{6,3} \quad \ldots \quad B_{12,3}$$

associated with the field of view 1010, the server may deliver blocks $B_{5,2}, B_{5,3}, \ldots B_{5,8}, B_{6,2}, B_{7,2}, \ldots B_{13,2}, B_{5,8}, B_{6,8}, \ldots B_{13,8}$, and $B_{13,3}, B_{13,4}, \ldots B_{13,7}$ which are disposed outside of and neighboring the blocks associated with field of view 1010 (within the area 1015). In some of examples, blocks $B_{5,2}, B_{5,3}, \ldots B_{5,8}, B_{6,2}, B_{7,2}, \ldots B_{13,2}, B_{5,8}, B_{6,8}, \ldots B_{13,8}$, and $B_{13,3}, B_{13,4}, \ldots B_{13,7}$ may be encoded for transmission using a bitrate lower than the blocks $$B_{6,7} \quad \ldots \quad B_{12,7}$$
$$\vdots \quad \ddots \quad \vdots$$
$$B_{6,3} \quad \ldots \quad B_{12,3}$$

associated with field of view 1010. At time T2, when the field of view changes to field of view 1020, blocks $B_{7,2}$, $B_{8,2}, \ldots B_{12,2}$ and $B_{13,2}, B_{13,3}, \ldots B_{13,6}$ whose indices were not associated with the previous field of view 1010 may be requested for display to the user. When two successive video frames have substantially same content with only small different details, since blocks $B_{7,2}, B_{8,2}, \ldots B_{12,2}$ and $B_{13,2}, B_{13,3}, \ldots B_{13,6}$ of the previous frame 1010 may have already been delivered to the user device at time T1 and have been available for being reviewed since time T1, consistent visual quality may be achieved and the user might still see video content (rather than blank images) at blocks $B_{7,2}, B_{8,2}, \ldots B_{12,2}$ and $B_{13,2}, B_{13,3}, \ldots B_{13,6}$) when the user turns his head and changes to the field of view 1020 at time T2. In some examples, blocks associated with the field of view 1020 and blocks neighboring to the blocks associated with the field of view 1020 may be encoded for transmission using a low bitrate, and an enhancement layer may be applied to the field of view. At time T2, the server may deliver blocks within the area 1025 to the user device. Although in the example illustrated in FIG. 10 one additional column and/or one additional row of blocks immediately neighboring blocks associated with the field of view 1010 or 1020 are transmitted to the user device, it should be understood that any number of columns and/or rows of blocks may be transmitted to the user device. Even though two successive video frames are described above as an example, the above described could instead happen between two successive video fragments.

Figure 11:
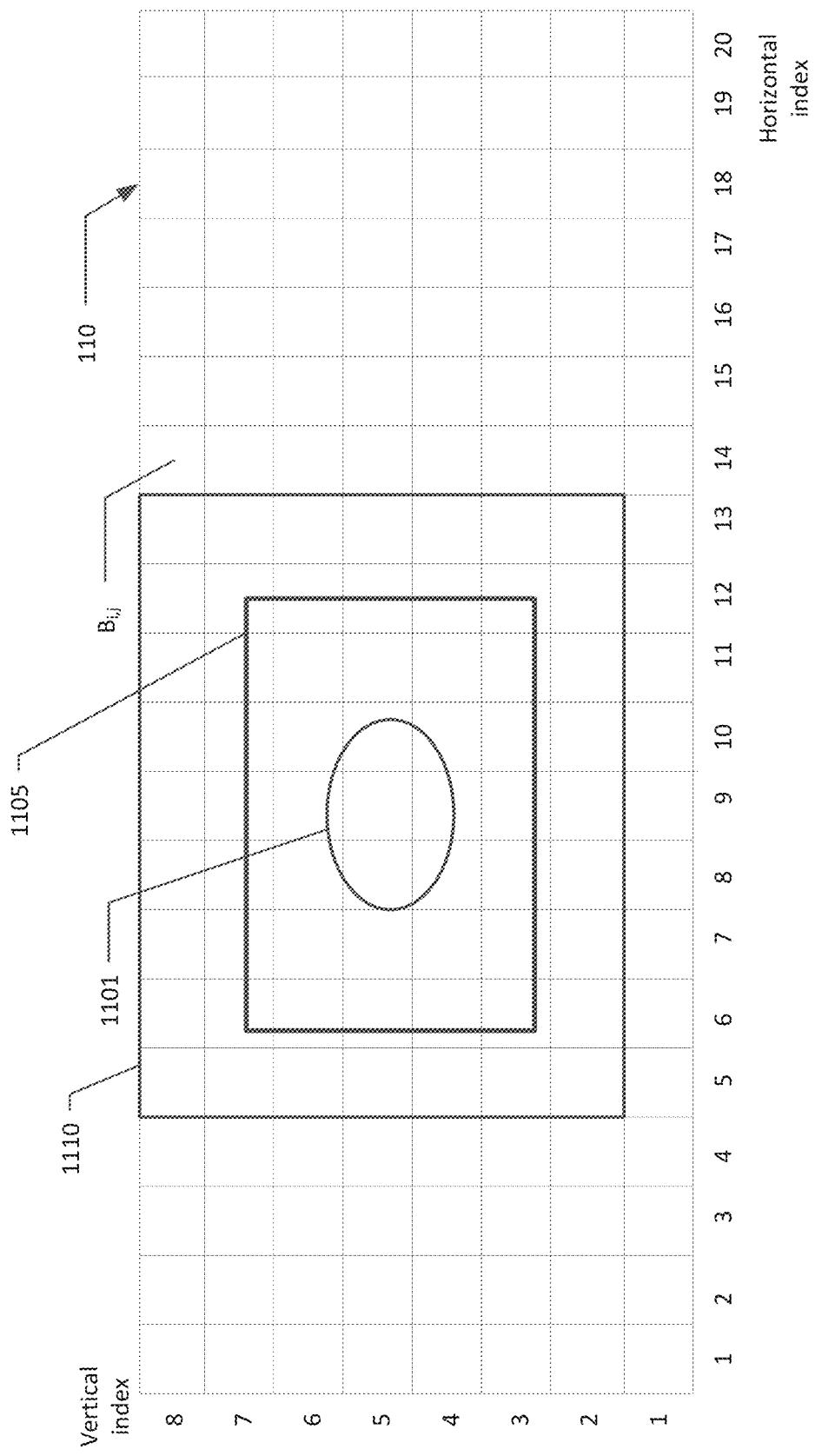
FIG. 11 illustrates an example of partial delivery of a partitioned video frame with an enhancement layer according to one or more illustrative aspects of the disclosure.

In some cases, when additional blocks outside of the field of view are transmitted, the server may allocate bandwidth between the blocks comprising the area of focus, the blocks comprising the field of view, and the additional blocks. An example of these cases will be described in FIG. 11. FIG. 11 illustrates an example of delivery of a partitioned video frame with an enhancement layer according to one or more illustrative aspects of the disclosure.

In the example of FIG. 11, blocks associated with field of view 1105, and blocks neighboring the blocks associated with field of view 1105, may be delivered to the user device. That is, blocks disposed within boundary of 1110 may be delivered to the user device. The blocks associated with the field of view 1105 and the blocks neighboring the blocks associated with field of view 1105 may be encoded for transmission. An enhancement layer may be encoded and transmitted to the user device to improve resolution of the blocks associated with field of view 1105. In some examples, another enhancement layer may be encoded and transmitted to the user device to further improve resolution of the area of focus 1101. In this example, the user may be provided with high resolution video content at the area of focus 1101.

Figure 12:
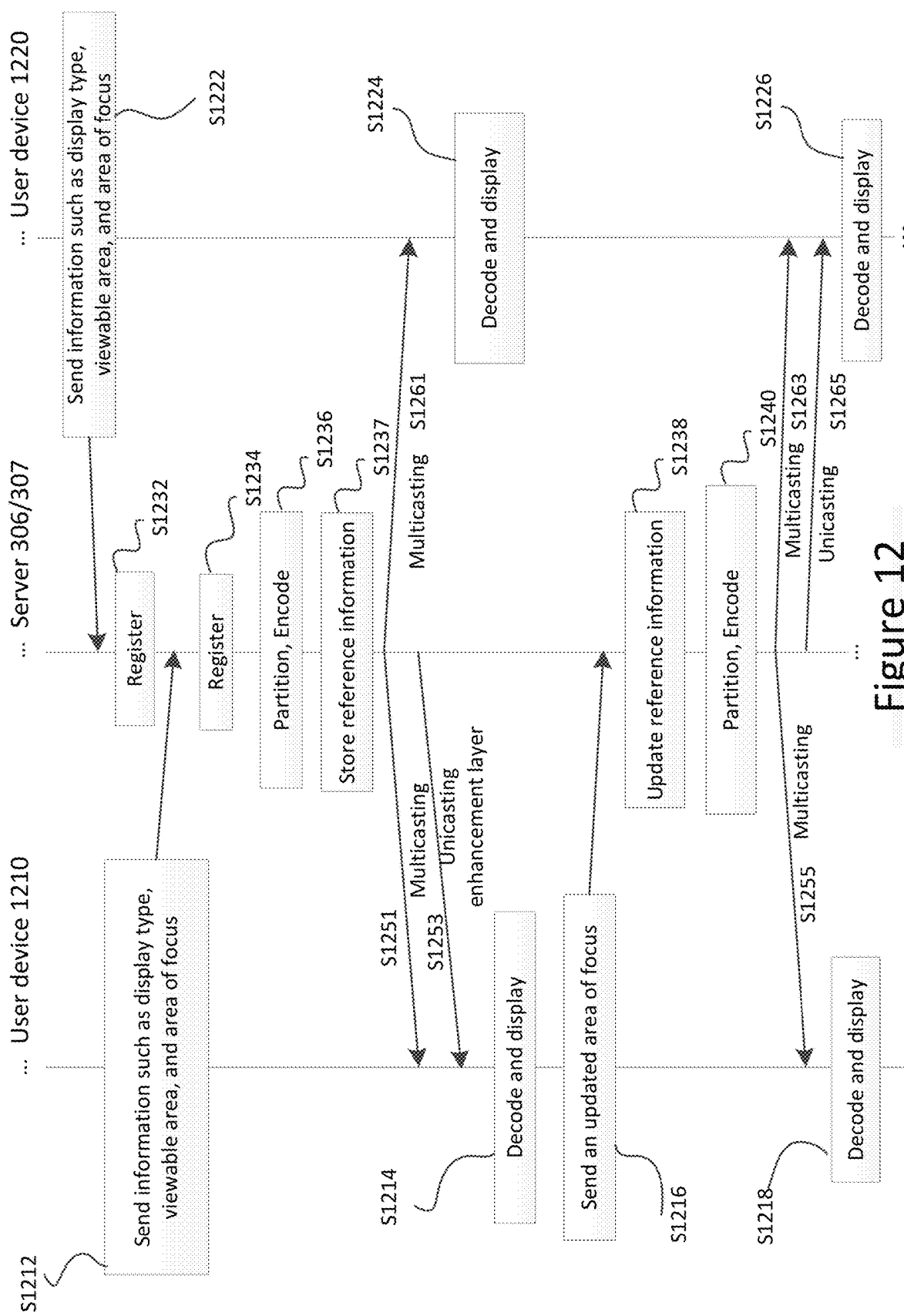
FIG. 12 is a signaling diagram of a method for video content delivery according to one or more illustrative aspects of the disclosure.

In some examples, multiple user devices may request a video frame for display, and the server may determine how to deliver the video frame to the multiple user devices based on data transmitted from the user devices, e.g., fields of view and areas of focus, and/or metadata included in the video file. In order to efficiently deliver the video frame to the multiple user devices, the server may multicast blocks associated with the aggregate area of focus and/or the common field of view to user devices and unicast blocks associated with the respective un-overlapped areas of the respective field of view and/or field of view to the respective user device. An example of delivering a video frame to multiple user devices will be described in FIG. 12. FIG. 12 is a signaling diagram of a method for video content delivery to multiple user devices according to one or more illustrative aspects of the disclosure.

In the example of FIG. 12, when a user (the user of either the user device 1210 or 1220) starts to watch video, the server may transmit the initial video frame(s) based on at least one of the metadata that indicates location(s) in the video frame(s) that should be given heightened attention, the pre-stored aggregate area of focus and/or common field of view which have been stored based on statistical data collected from other users who have watched at least a portion of the video content, or other pre-stored criteria that allow the server to determine how to transmit the initial video frame(s). During the consumption of the initial video frame(s), the user device has tracked the field of view and the area of focus of the user. These steps are not illustrated but may be performed before step S1222.

At step S1222, the user of the user device 1220 has consumed the initial frames and continues to consume the rest of the video content, and the user device 1220 may transmit parameters, e.g., information indicating type of display, information indicating the previously tracked field of view, and information indicating the previously tracked area of focus, to the server, e.g., at least one of the content server 306 and the application server 307. As discussed above, the information of field of view may include regions on the display that the user can see at a given moment in time, and the information of the area of focus may include regions on the display that the user is focused on.

At step S1232, the server may receive these parameters transmitted at step S1222, and register these parameters for user device 1220 in a database.

At step S1212, similarly to the user device 1220, the user device 1210 may transmit parameters, e.g., information of type of display, information of field of view, and information of area of focus, to the server.

At step S1234, the server may receive the parameters transmitted at step S1212, and register these parameters for user device 1210 in the database.

It should be understood that, before the video is transmitted to the user devices, the server may partition each of the video frames included in the video into blocks, create multiple versions of resolutions for each block of each of the video frames, and store these versions of the blocks in a database for future use in delivering the video. Alternatively, the server may perform the partitioning and encoding in a real-time fashion, e.g., partitioning and encoding a video frame upon the video frame being requested for access. At step S1236 in the example of FIG. 12, the server partitions a video frame and create multiple versions for each block before upon the video frame is requested for access by both of the user devices 1210 and 1220.

In step S1236, the server may determine the aggregate area of focus based on information of area of focus received by the user devices 1210 and 1220. As discussed previously, the server may create a baseline layer of the entire video frame for transmission (e.g., via multicast transmission which will be described in steps S1251 and S1261) to the user devices 1210 and 1220, and create a separate stream comprising enhancement layer data for transmission (e.g., via unicast transmission which will be described in steps S1253) to enhance the respective user's area of focus. During the creation of the baseline layer, the sever may select, for transmission, one of bitrate version for each block, and may select a higher bitrate version for blocks disposed within the aggregate area of focus than blocks disposed outside the aggregate area of focus.

In some cases, the server may determine the aggregate area of focus based on the metadata. For example, the metadata may have indices of blocks including content of an event. In these cases, the server may include a higher bitrate version for the blocks including the content of the event in the baseline layer and include a lower bitrate version for blocks not including the content of the event in the baseline layer.

In some cases where the fields of view of the users of the user devices 1210 and 1220 do not comprise all blocks of the video frame, the baseline layer may only include blocks within either of the fields of view and not include blocks completely outside either of the fields of view.

In some cases, the server may determine any change of aggregate or local area of focus for the users of the user devices 1210 and 1220 and may update indices of blocks of the next frame to be transmitted based on such change.

In some cases, the server may perform the partitioning and encoding can be done prior to a request to view the content.

It should be understood that the server may encode the video frame by any other methods that have been described or will be described in the disclosure and that have been known as necessary procedures during an encoding process.

At step S1237, the server may store data representing common field of view and aggregate area of focus for future reference. The data may include indices of the blocks associated with the common field of view and indices of the blocks associated with the aggregate area of focus.

At step S1251 and step S1261, the server may multicast some or all of the blocks to the user devices 1210 and 1220. This multicast transmission may include the entire frame 30, or in some embodiments, the multicast transmission may only include the blocks in the overlapping field of view between the user devices 1210 and 1220 (with perhaps the additional neighboring blocks discussed above). In some embodiments, this multicast transmission may contain the overlap blocks in a baseline resolution, and may include enhancement layer information as well.

In step S1253, the server may transmit a unicast transmission to the user device 1210. The unicast transmission may contain enhancement layer information for the block(s) that are in the first user's area of focus, minus any enhancement layer information that may have been included in the multicast transmission above. A similar unicast transmission may be made for the user device 1220, containing enhancement layer information for the blocks in the second user's area of focus. However, in FIG. 12, the user device 1220 is not shown as receiving this unicast transmission, and this may occur if, for example, the user of that device happened to have a small focus area whose enhancement layer information was already included in the multicast transmission received above.

At step S1214, the user device 1210 may receive the multicast blocks and unicast blocks from the server, decode the received blocks, and display video content of the decoded blocks. At step S1224, similarly to the user device 1210, the user device 1220 may receive the multicast blocks from the server, decode the received blocks, and display video content of the decoded blocks.

When the user of the user device 1210 changes his area of focus, the user device 1210 may send information, at step S1216, representing his updated area of focus to the server. At step S1238, upon receiving the information from the user device 1210, the server may register the updated area of focus for the user device 1210 and update the aggregate area of focus based on the changed area of focus of the user.

At step S1240, based on data representing the updated aggregate area of focus, the server may partition a subsequent video frame into blocks and encode the blocks. Description above with respect to step S1236 may be applied to step S1240.

At steps S1255 and S1263, the server may multicast blocks associated with the updated aggregate area of focus to both of the user devices 1210 and 1220. In some examples, these multicast streams for the blocks associated with the updated aggregate area of focus may replace the previous multicast streams for the blocks associated with the previous aggregate area of focus.

At step S1265, the server may unicast to user device 1220 an enhancement layer applied to the area of focus of the user of user device 1220 based on a determination that the area of focus of the user of user device 1220 is different from the updated aggregate area of focus.

At step S1218, the user device 1210 may receive the multicast blocks from the server, decode the received blocks, and display video content of the decoded blocks. At step S1226, the user device 1220 may receive the multicast blocks and/or unicast blocks from the server, decode the received blocks, and display video content of the decoded blocks. During the decoding the received blocks, the user device 1210/1220 may recombine the received blocks into the original image by using the coordinates in the horizontal and vertical indices of each block.

It should be understood that the above steps can be repeated as long as the users of the user devices 1210 and 1220 continue to watch the program.

Even though two user devices are illustrated in FIG. 12, it should be understood that any number of user devices may be included in the communication system. In some examples, the server may register information indicating a type of display for more than two user devices and may divide the user devices into groups having a same type of display. When the server determines that multiple user devices are using a same type of display, the server may group the multiple user devices and multicast blocks associated with the field of view of this type of display to the group. The server may additionally multicast blocks neighboring the blocks associated with the field of view to the group. When the server determines that only a single user uses a particular type of display, the server may unicast blocks associated with the field of view of this particular type of display to the single user. The server may additionally unicast blocks neighboring the blocks associated with the field of view to the single user. In some examples where the type of display of a group is a wired headset, the users of this group view a 360 degree video with the wired headsets, and viewable angles of the users are less than 360 degrees, e.g., 240 degrees. The server may determine to deliver only 240 degree, rather than 360 degree, of the video content to this group of user devices.

In some examples, at step S1222 or S1212, the user device may additionally transmit a vision profile of the user to the server. When the user's vision profile shows that the user's vision exceeds a predetermined threshold (e.g., a visual acuity of 20/20), the server may unicast an additional enhancement layer applied to the area of focus of the user to the user device. By doing so, the resolution of the user's area of focus may be increased to account for the user's strong eyesight. In some examples, when the user's vision profile shows that the user's vision is below a predetermined threshold (e.g., a visual acuity of 20/100), the server may determine not to transmit enhancement layer(s) corresponding to blocks within the area of focus because details requiring higher resolution presentation might not be seen by the user anyway because of his poor vision.

It should be understood that the steps in the signaling diagram illustrated in FIG. 12 need not all be performed in the order specified and some steps may be omitted, changed in order, or performed simultaneously. In one example, step S1212 may be performed before S1222. In a second example, step S1251 and step S1253 may be performed simultaneously; and step S1263 and step S1265 may be performed simultaneously. In a third example, step S1214 may occur before or after or simultaneously with step S1224; and step S1218 may occur before or after or simultaneously with step S1226. In a fourth example steps S1216 and S1238 may be omitted if the user of the user device 1210 does not change his area of focus. In one or more embodiments, the method illustrated in FIG. 12 or one or more steps thereof may be performed by one or more computing devices or entities. The method illustrated in FIG. 12, or one or more steps thereof, may be embodied in computer-executable instructions that are stored in a computer-readable medium, such as a non-transitory computer readable medium.

Figure 13:
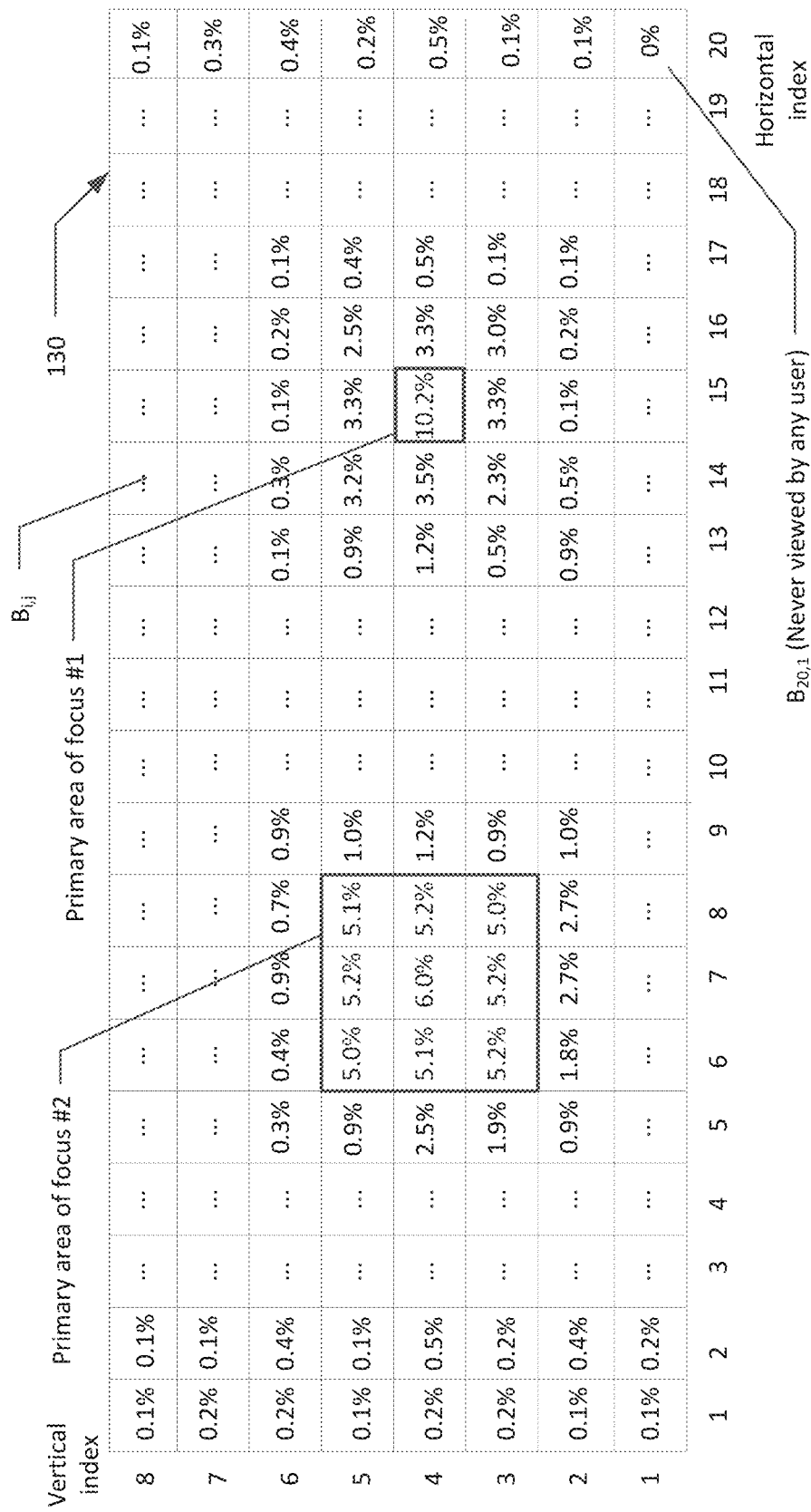
FIG. 13 illustrates an example of statistical data that may be used for determining an aggregate area of focus based on statistical data according to one or more illustrative aspects of the disclosure.

FIG. 13 illustrates an example of determining an aggregate area of focus based on statistical data according to one or more illustrative aspects of the disclosure. The statistical data includes information representing common areas of focus of all of or at least some users who are viewing or have viewed the video frame. In this illustration, after multiple users have watched a video, the server determines that each block of each video frame 130 of the video receives a percentage of users' attention from the multiple users viewing the video frame 130. For example, block $B_{15,4}$ receives 10.2% of users' attention, and this means that, out of every 1000 users, 102 users are focusing on block $B_{15,4}$. Since the percentage of attention from all users that block $B_{15,4}$ receives is significantly higher than its neighboring blocks, e.g., $B_{14,3}$, $B_{15,3}$, $B_{16,3}$, $B_{16,4}$, $B_{16,5}$, $B_{15,5}$, $B_{14,5}$, and $B_{14,4}$, the server may determine that the area that $B_{15,4}$ covers is an aggregate area of focus #1. The server may identify an aggregate area of focus by comparing a percentage of attention of a block to percentages of attention of neighboring blocks. For example, an aggregate area of focus may be determined when a block receives a percentage of attention that is greater, by a predetermined amount (e.g., 6%), than a percentage of attention received by any of the block's neighboring blocks. Alternatively or in addition, the server may identify an area of focus when a group of blocks receives a percentage of attention significantly greater, by a predetermined amount (e.g., 4%), than its neighboring blocks by a predetermined percentage. For example, if an average percentage of attention of each block of a matrix of blocks $$\begin{matrix} B_{6,5} & \ldots & B_{8,5} \\ \vdots & \ddots & \vdots \\ B_{6,3} & \ldots & B_{8,3} \end{matrix}$$

is greater than a percentage of attention received by any of its neighboring blocks by a predetermined percentage, the server may identify the area covered by such group as an aggregate area of focus #2. Once the aggregate areas of interest are identified, the server may register information representing the aggregate areas of interest for this video frame for future reference. Even though in the example of FIG. 13, two aggregate areas of focus are identified, it should be understood that any number of aggregate areas of focus may identified. For example, a first aggregate area of focus with the greatest number of the area of focus common to all the user devices may be determined, the secondary aggregate area of focus (the second greatest number of the area of focuses common to all the user devices) may be determined, the third aggregate area of focus (the third greatest number of the area of focuses common to all the user devices) may be determined, and so on.

In some cases, in order to optimize usage of the storage of the server, the server may edit bitrate versions of the video frame stored in the storage of the server. In these cases, before a video frame has been transmitted for the first time or has been initially transmitted to user devices a number of times (e.g., 100 times, if the viewing analysis shows statistically significant trends after 100 times of views), the server may store information representing one or more bitrate versions (e.g., a lowest possible bitrate to a highest possible bitrate and certain bitrate points in between) for each block based on metadata included in the video file and provided by the video editor. During delivery of the video frame for the initial number of times, the server may deliver blocks with one of the predetermined or received bitrate versions. After delivering the video frame for the initial number of times, the server may receive statistical data from user devices and may modify the bitrate versions by deleting certain bitrate versions based on the received statistical data. Statistical data may include users' selections of bitrate versions, users' satisfaction of resolution of different bitrate versions, or other statistical data. For example, after the initial number of times delivery, when the statistical data indicates that a bitrate version of a block has received a percentage of users' attention that is lower than a minimum required percentage (e.g., 0.1%, if the viewing analysis shows statistically significant trends based on the 0.1% of users' attention), the server may delete this bitrate version from the storage of the server. In some cases, the deleted bitrate version may be moved to and stored in a storage of a higher level server. If one block has more than one optimized bitrate version, the server may rank the more than one optimized bitrate version based on users' past view requests and may select the most optimal bitrate version for the block for future delivery. Similarly, each group of blocks may be assigned with a most optimal bitrate version. With the block(s) of the video frame being further delivered to the user devices, more statistical data may be received by the server from the user devices and thus the bitrate versions may be further updated for the video frame in a similar manner as in the delivery of the video frame for the initial number of times.

In some cases, in order to further optimize usage of the storage of the server, the server may edit the permanent copy of the video stored in the storage of the server so that only the blocks that are seen by the users are kept in the storage of the server, and other blocks that are never seen by the users are deleted from the storage of the server. As in the example of FIG. 13, statistical data (e.g., 0%) shows that block $B_{20,1}$ has not been viewed by any users, over a predetermined time period (e.g., 3 years). Based on the statistical data, the server might not encode blocks that have not been viewed or are infrequently viewed, such as block $B_{20,1}$, because it is unlikely that these blocks will be delivered, or delivered frequently, to any users. Even though block $B_{20,1}$ is deleted from the storage of the server, this block may be kept in a storage of a higher level server, so that in the case that this block is eventually requested by a user(s), the higher level server may provide this block to a user(s).

In some cases, in order to improve the user's satisfaction, the server may determine whether the video editor should recreate certain scenes based on the statistical data. For example, after one or more blocks (and/or one or more groups of blocks) have been multicast with the most optimal bitrate for a certain time period, users may provide feedback indicating that the most optimal bitrate version for one or more blocks (and/or one or more groups of blocks) does not satisfy at least some of the users. For example, some of the users may complain that an area of about 5 cm$^2$ at the central portions of several sequentially displayed video frames (from time 1:20:00 to 1:20:15) is not clear. The server may receive such feedback and forward the feedback to the video editor. The video editor may either reshoot the scene covering the one or more blocks (and/or one or more groups of blocks) in a desirable resolution, or modify or recreate the one or more blocks (and/or one or more groups of blocks) with a computer generated model for the one or more blocks (and/or one or more groups of blocks) to provide a better viewing experience (e.g., better resolution) to the users. Referring back to FIG. 8, even though each block is shown to be encoded, it should be understood that, in some implementations, not every block will be encoded.

In some examples, video content may be associated with non-video content (e.g., audio content comprising stereo audio, 5.1 audio, object based audio, ambisonic audio, alternative audio, etc.). Object based audio and ambisonic audio may provide 3D sound effect to users. These techniques associate the audio content with virtual locations of the objects shown in a video, and the speaker setup of the user uses the association between the audio content and the virtual locations of the objects to determine how to present the sound encoded in the audio content. For example, for a video showing a car explosion in a plaza, the audio content encoded with the exploding sound of the car is associated with the virtual location of the exploded car. The speaker setup of the user receives the audio content and determines that the exploding sound of the car should be transmitted from the virtual location of the exploded car. The speaker setup then determines how each speaker contributes to produce the exploding sound, and each speaker produces respective sound based on such determination. When a video streaming segment is selected to be transmitted to the user(s), the corresponding a streaming segment may be downloaded with any one of the various bitrates independent of bitrate with which the corresponding video streaming segment is transmitted. When the non-video content is encoded with the video content in a common data stream, the non-video content may be an encoded indexed non-video file which is divided into multiple non-video MBR blocks for each video frame. For one video frame, each non-video MBR block corresponds to a respective video MBR block, and this means that video content represented by each video block has corresponding non-video content represented by a non-video MBR block. These features will be discussed with reference to FIG. 14.

Figure 14:
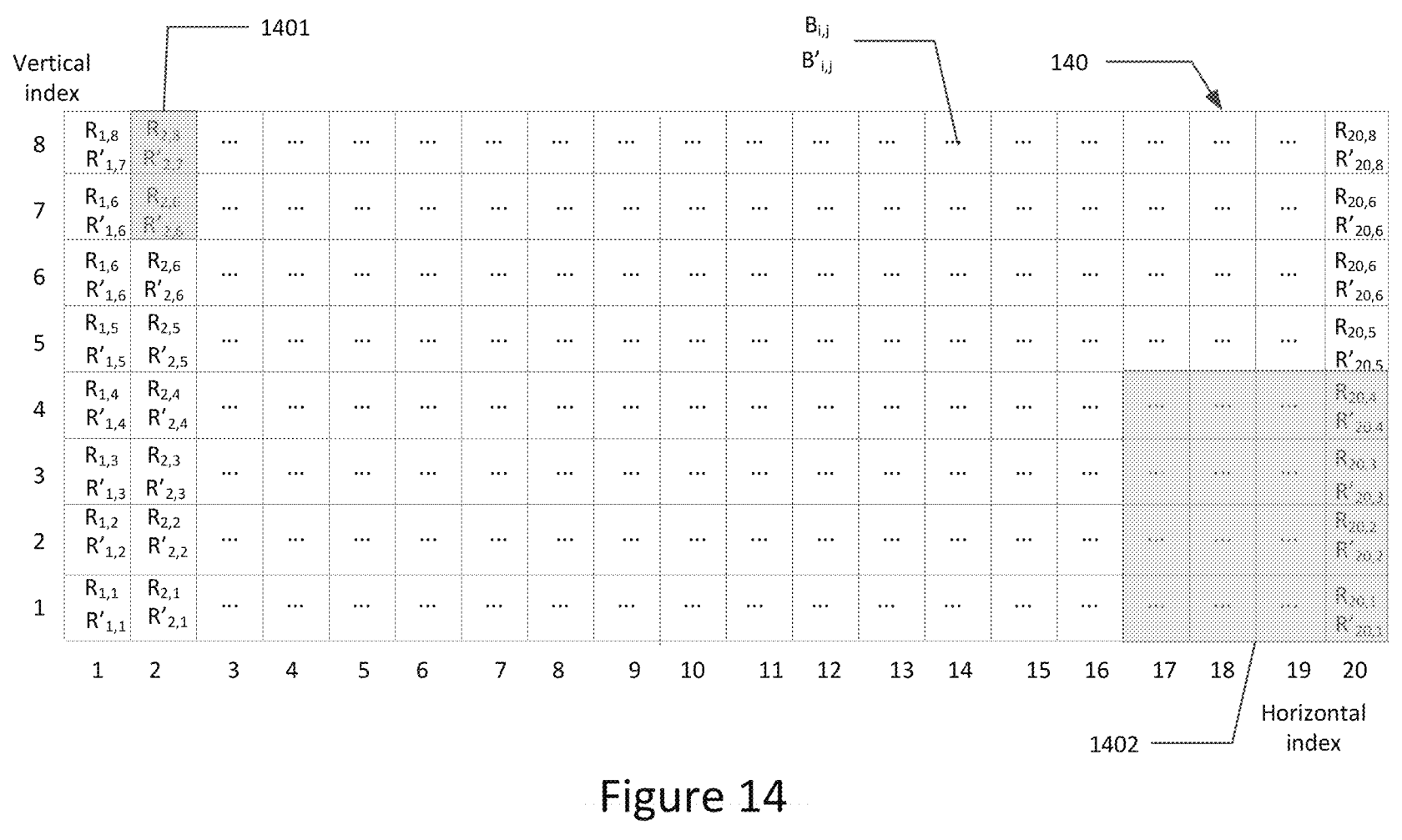

FIG. 14 illustrates an example of non-video content associated with a video frame according to one or more illustrative aspects of the disclosure. In this example, in video frame 140, each video block $B_{i,j}$ corresponds to a non-video block $B'_{i,j}$ including non-video information for the respective block $B_{i,j}$. In order to show that each video block $B_{i,j}$ has its corresponding non-video content, the corresponding non-video content is illustrated as being included in a non-video block $B'_{i,j}$ and the non-video block $B'_{i,j}$ is illustrated to completely overlap with the corresponding video block $B_{i,j}$.

In some cases, some non-video blocks may be encoded for transmission using a same bitrate. In some other cases, each non-video block may be encoded for transmission using a bitrate different from that of any one of the other non-video blocks. For example, non-video block $B'_{10,3}$ is encoded for transmission using a bitrate $R'_{10,3}$ that may be different from those of other non-video blocks, or alternatively, may be same as that of one or more of the other non-video blocks. When multiple video blocks are packaged into a group, the corresponding non-video blocks may be packaged in a corresponding group. Similarly to a group of video blocks, the group of non-video blocks may be encoded and transmitted as an entirety. Even though each video block $B_{i,j}$ corresponds to a respective non-video block $B'_{i,j}$, it should be understood that in some examples where some portions of a video frame are not associated with any non-video content, one or more video block could have no corresponding non-video block $B'_{i,j}$. In some cases, two or more video blocks may share a same non-video block.

In an example that the non-video content comprises audio content, a video frame may include a scene having a singing bird 1401 (represented by 2 video blocks) and a silent stone 1402 (represented by 16 video blocks) which are far away from each other (meaning that the sound that the singing bird 1401 makes may not be heard at the location where the silent stone 1402 resides), video blocks associated with the singing bird 1401 may have corresponding audio blocks, and video blocks associated with the silent stone 1402 might not have corresponding audio blocks. When a user focuses on the singing bird 1401, the video blocks representing the singing bird 1401 may be transmitted to the user device in a first bitrate, and the corresponding audio blocks may be transmitted to the user device with a second bitrate, such as a second bitrate selected by the user. When the focus of the user shifts to a block (e.g., on block $B_{8,5}$) located between the singing bird 1401 and the silent stone 1402, the audio blocks corresponding to the singing bird 1401 may be transmitted at a bitrate version lower than the second bitrate selected by the user since the user expects fading sound from the singing bird 1401. When a user focuses on the silent stone 1402, the video blocks representing the silent stone 1402 may be transmitted to the user device, and corresponding audio blocks might not be transmitted to the user device.

In another example, a video frame includes a scene having a single character playing symphonic orchestra music. Since a consumer of such scene is generally more interested in audio content than the video content, when the consumer selects the music playing scene for display, the video blocks representing the speech scene may be encoded for transmission using a lower bitrate within a bitrate range with which video content is normally encoded, and the corresponding audio blocks may be encoded for transmission using a higher bitrate within a bitrate range with which audio content is normally encoded. In some examples, information of scene may be retrieved from the metadata of the video content. In this way, network bandwidth may be saved without negatively impacting the consumer satisfaction, and the server may dynamically adjust bandwidth allocation between the video content and audio content that associated with the video content.

In some examples, the non-video content may comprise closed captioning (CC) content. CC content may, for example, contain textual transcripts of spoken words in an audio track that accompanies the video stream. In some cases where CC content is embedded in video content, when a user moves his eyes, the CC may move along with the user's eye movement so that the CC text may always, for example, appear at the lower-right of the user's field of view. In other cases where CC content is not embedded (non-embedded CC) in the video content, when a user moves his eyes, the non-embedded CC does not move corresponding to the user's eye movement, that is the CC text may always, for example, appear at the center of the lower portion of the video frame. In a video frame, the region covered by the CC content may be encoded for transmission twice along with two types of blocks, one with CC content and one without CC content, and the system may transmit and/or decode the correct version depending on whether CC content is to appear. Examples of transmission of a video frame including CC will be described in details in FIGS. 15 and 16.

Figure 15:
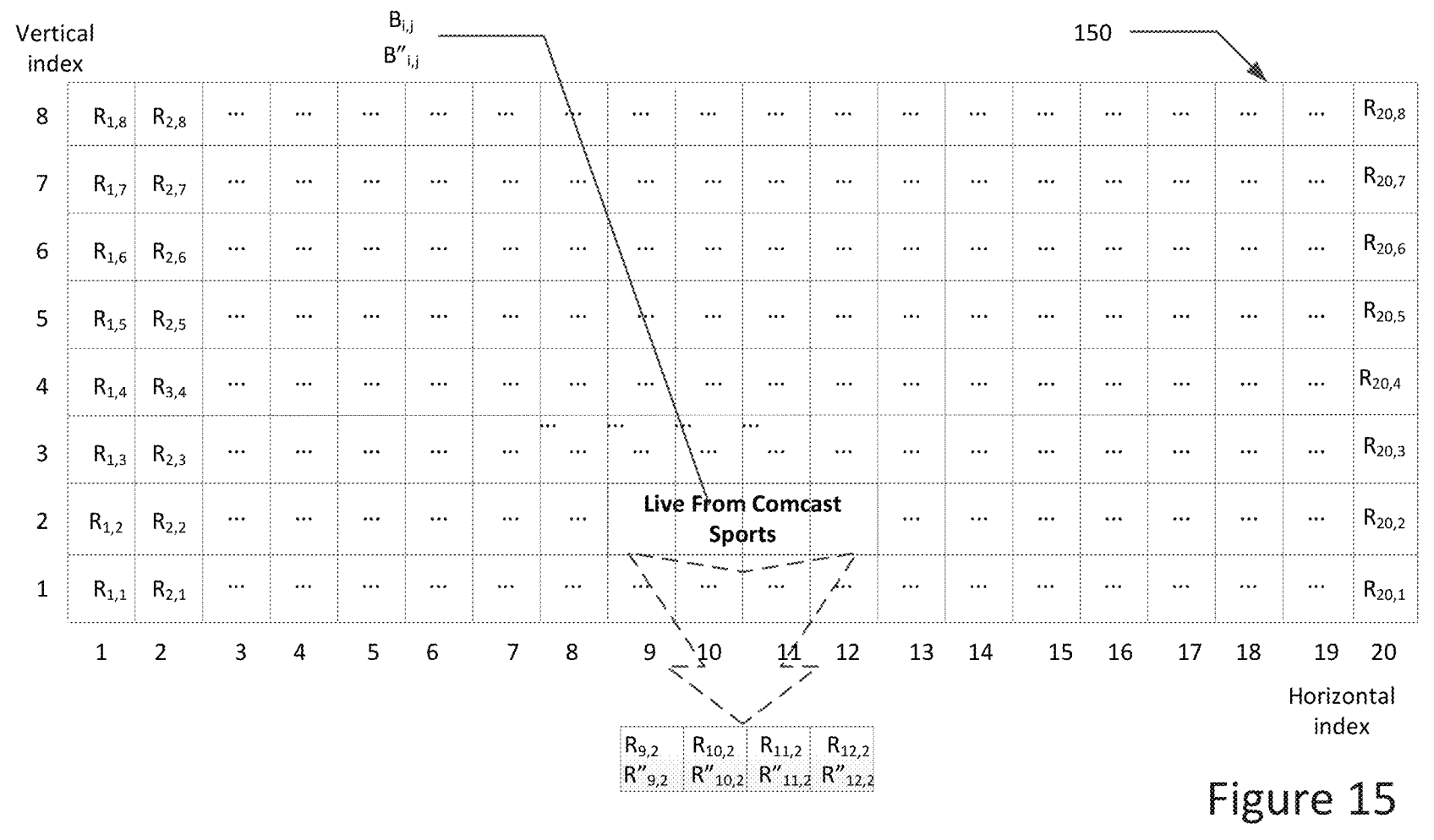

FIG. 15 illustrates an example of delivering embedded closed captioning content associated with a video frame 150 according to one or more illustrative aspects of the disclosure. In this example, a region covered by CC content (e.g., textual transcripts "Live From Comcast Sports") may correspond to two sets of blocks $B_{i,j}$ (e.g., $B_{9,2}$, $B_{10,2}$, $B_{11,2}$, and $B_{12,2}$) which are blocks without CC content, and $B''_{i,j}$ (e.g., $B''_{9,2}$, $B''_{10,2}$, $B''_{11,2}$, and $B''_{12,2}$) which are blocks embedded with CC content. When a user selects to turn off CC content, the server may deliver blocks $B_{9,2}$, $B_{10,2}$, $B_{11,2}$, and $B_{12,2}$ which do not include CC content. When a user selects to turn on CC content, the server may deliver blocks $B''_{9,2}$, $B''_{10,2}$, $B''_{11,2}$, and $B''_{12,2}$ which include CC content. Block $B_{i,j}$ may be encoded for transmission using bitrate $R_{i,j}$ which may a same or different bitrate as bitrate $R''_{i,j}$ of block $B''_{i,j}$. In some cases, blocks $B''_{9,2}$, $B''_{10,2}$, $B''_{11,2}$, and $B''_{12,2}$ covered by CC content may be encoded for transmission using a bitrate lower than the bitrate encoded with surrounding blocks not covered by CC content.

FIG. 16 illustrates an example of delivering non-embedded CC content associated with a video frame 160 according to one or more illustrative aspects of the disclosure. In this example, CC content is not embedded in video content but covers video content in some region of a video frame. As shown in FIG. 16, the region covered by CC content (e.g., textual transcripts "Live From Comcast Sports" with a black background) may correspond to two sets of blocks $B_{i,j}$ (e.g., $B_{9,2}$, $B_{10,2}$, $B_{11,2}$, and $B_{12,2}$) which are video blocks without CC content and blocks $B'''_{i,j}$ (e.g., $B'''_{9,2}$, $B'''_{10,2}$, $B'''_{11,2}$, and $B'''_{12,2}$) which are CC content blocks including CC content with a black background. In this case, when a user selects to watch CC content, the server delivers $B'''_{9,2}$, $B'''_{10,2}$, $B'''_{11,2}$, and $B'''_{12,2}$ to the user device. Alternatively, the region covered by CC content (e.g., textual transcripts "Live from Comcast sports" with a black background) may correspond to one set of blocks $B'''_{i,j}$ (e.g., $B'''_{9,2}$, $B'''_{11,2}$, and $B'''_{12,2}$) which are CC content blocks including CC content with a black background. When a user selects to watch CC content, the server delivers $B'''_{9,2}$, $B'''_{10,2}$, $B'''_{11,2}$, and $B'''_{12,2}$ to the user device. The user device may download the CC content blocks and might not download the video content covered by the CC content blocks. It should be understood that CC content may be locked to a fixed location for each video frame, or alternatively, may move around among different video frames.

In the aforementioned examples, delivery of video content via a communication system may be applicable to delivery of 2D video content. The present discourse is not limited thereto, and may be applied to delivery of three-dimensional (3D) video content. 3D video content, such as pre-recorded or live 3D video content, may be offered by one or more 3D content sources. The 3D content sources may capture video 3D content using one or more cameras. Cameras may be any of a number of cameras that are configured to capture video content. Cameras may be configured to capture two off-set two-dimensional (2D) video content for a left eye and a right eye, respectively, of a user. The captured 2D video content may be used for generation of 3D video content for transmission to a user device. The user device may be a television display device and/or some other computer implemented device where different video content may be supplied to eyes of a user by two different outputs.

Figure 17:
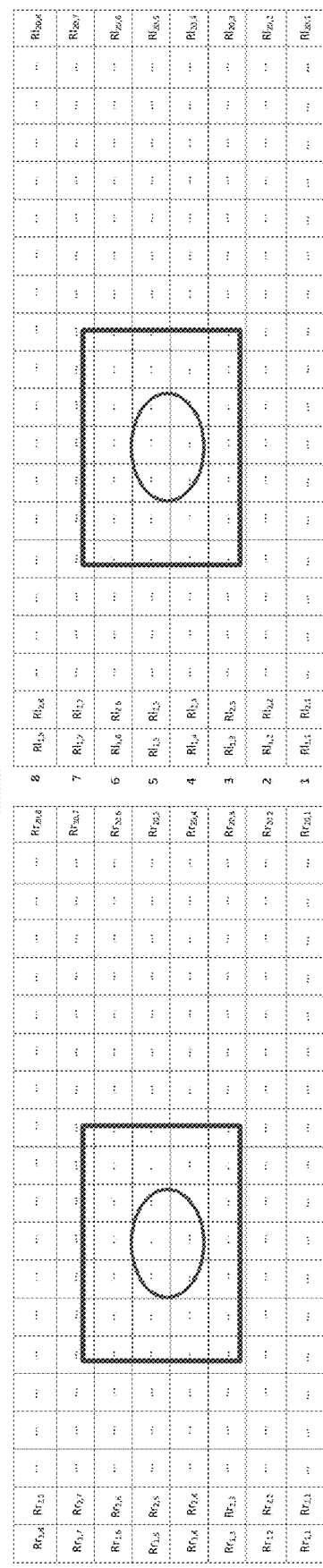
FIG. 17 illustrates an example of delivering 3D video content according to one or more illustrative aspects of the disclosure.

FIG. 17 illustrates an example of delivering 3D video content according to one or more illustrative aspects of the disclosure. In this example, in order to provide a stereoscopic view to a user, the server (at least one of the content server 306 and the application server 307) may provide to the user device 1766, one encoded 2D video frame 1702 for the right eye of the user and another encoded 2D video frame 1704 for the left eye of the user. The encoded 2D video frames 1702 and 1704 may include an identical scene but are captured and tailored for right and left eyes respectively, and may be delivered to the user device 1766 simultaneously or alternately. The server may package and encode the video frame 1702 independently of the video frame 1704. The server may encode each block of the video frame 1702 for transmission using a respective bitrate $Rr_{i,j}$ and may encode each block of the video frame 1704 for transmission using a respective bitrate $Rl_{i,j}$. The bitrate $Rr_{i,j}$ and the bitrate $Rl_{i,j}$ may be a same or a different bitrate. The user device 1766 may receive and decode the two video frames 1702 and 1704 for display. Through a pair of 3D eyeglasses 1710, the left eye of the user sees the decoded 2D video frame 1704 for the left eye, and the right eye of the user sees the decoded 2D video frame 1702 for the right eye.

In some cases where one eye (e.g., the right eye) of a user may have better vision than the other (e.g., the left eye), the server may encode blocks of the video frame 1702 for transmission using a higher bitrate and encode blocks of the video frame 1704 for transmission using a lower bitrate. In some examples, during a training procedure, the user may input his vision profile into the user device, and the user device 1766 may transmit the user's vision profile to the server. The vision profile may include visual acuity, refractive error, hyperopia, myopia, astigmatism, and etc. The server may receive and register the user's vision profile in a database. Based on the user's vision profile, the server may apply higher bitrates to video frames for the eye with better vision and apply lower bitrates to video frames for the eye with worse vision. Alternatively, the server may apply a same bitrate to both video frames and apply enhancement layers for the eye with better vision.

In some cases, the field of view and area of focus (or the aggregate area of focus) of the left eye may be substantially identical to those of the right eye. Methods of delivery of a video frame described in FIGS. 3A through 16 may be utilized to deliver each of video frames 1702 and 1704.

In some examples, to increase comfortability of a user watching a stereoscopic/3D video, the CC content for the stereoscopic/3D video may be placed to the user at a perceived distance which is substantially equal to a perceived distance from the main video content (e.g., the video content within the area of focus) to the user. This can be done by synchronizing metadata on the perceived depth of the CC content and metadata on the perceived depth of the main video content. The metadata on perceived depth of video content may be obtained from one or more depth captures as part of the camera rigs, computed using videogrammetry techniques, or editor-provided minimum-distance figures.

In some examples, the server may provide both the 2D and 3D versions of video content to satisfy both 2D and 3D display devices. In these examples, when the user makes a sudden movement like turning his head or sitting down, a 3D effect may be disorienting, and in those situation, the server may temporarily send only the 2D version of the video content instead of the 3D version, to help avoid that disorientation. For example, when a user is viewing a 3D video with a 3D user device, the 3D display device tracks movement of eyes of the user and transmits information representing the eye movement to the server. The server receives the information and determines that 3D image can be rendered with such movement, the server may compensate for such movement or rotation by modifying the encoded video frames for at least one eye. When the server determines that the 3D image cannot be rendered with such movement, the server may begin delivering the 2D version of the video content to the user device. In some examples, the server may switch back to 3D image from the 2D version after a certain time period. To realize the switching from 3D image to 2D image, the server may either switch from stereoscopic video to monoscopic video by showing a same video to both eyes, or only show the video to one of the eyes and block the video to the other eye. In the case that a user initially sits on a sofa and suddenly lies down, the server may consider that the amplitude of such movement exceeds the threshold and indicates that the 3D image cannot be rendered. It should be understood that the above modifying may be triggered in some cases regardless of user movement, e.g., when monitoring tools/analysis indicate that the depth image is undesirable.

Figure 18:
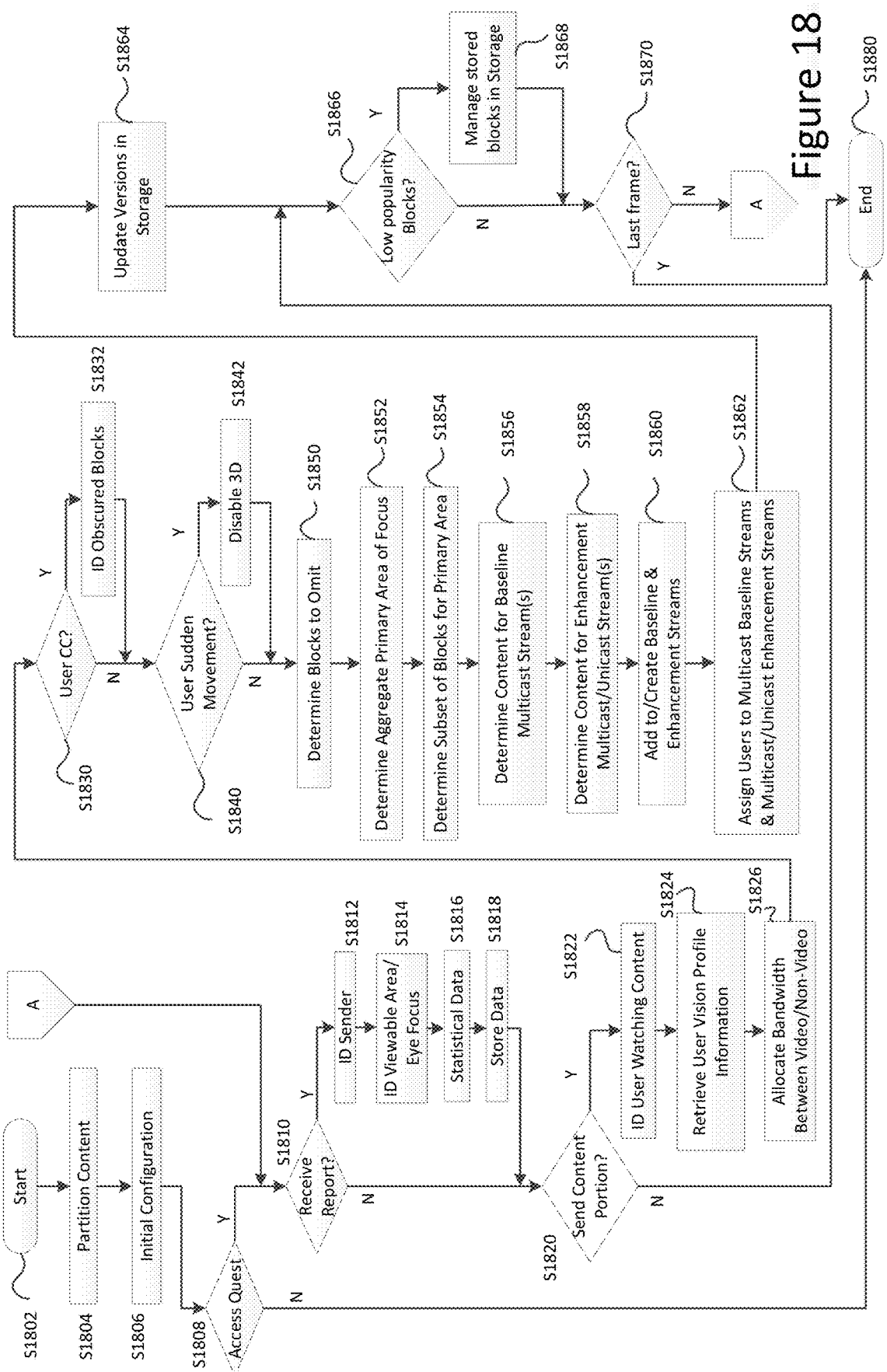
FIG. 18 is a flow diagram of a method for transmitting video content according to one or more illustrative aspects of the disclosure.

FIG. 18 is an exemplary flow diagram of a method for transmitting video content according to one or more illustrative aspects of the disclosure. It should be understood that the steps in FIG. 18 are illustrated by way of example and do not limit the scope of the present disclosure.

The process starts from step S1802 in which the server receives a new video file including a plurality of video frames.

At step S1804, each of the plurality of the video frames may be partitioned into a plurality of blocks (e.g., FIGS. 3A and 3B).

At step S1806, since the requested video frames have never been previously requested and transmitted to any user devices, the server may determine initial configuration, e.g., bitrate, of each of the blocks of each video frame. The server may predetermine or receive information representing one or more bitrate versions (e.g., a lowest possible bitrate to a highest possible bitrate and certain bitrate points in between) for each block based on metadata included in the video file and provided by the video editor.

At step S1808, one or more user devices send request(s) to the server for accessing content. The content may include video content and optionally non-video content (e.g. FIG. 14), e.g., associated audio content. In this step, the server may determine whether the user device has the authorization to access the requested content based on certain criteria, e.g., the service subscription of the user device. Upon the determination that the user device has the authorization to access the requested video content, the process starts from the first video frame of the plurality of the video frames and proceeds to the next step S1810. Upon the determination that the user device does not have authorization to access the requested video content, the process proceeds to the end S1880.

At step S1810, the server may determine whether a report, which indicates, for example, what user devices were looking at in the requested video frame, has been received from the user devices. For the content that has been previously accessed, the report may be transmitted from the one or more user devices that have previously accessed the video frame. It is noted that for the first-time requested content, the server has not received any reports from user devices, and in this case, the process proceeds to the next step S1820.

When the server determines that a report is received by the server, the server may proceed to steps S1812-S1818. At step S1812, the server may use data included in the report to identify the sender (e.g., the one or more user devices) and a type of the sender; at step S1814, the server may identify the field of view of the user of the sender and the area of focus of the user of the sender; and at step S1816, the server may receive statistical data comprising user's feedback on previously-delivered video frame(s). At step S1818, the server may store the data included in the report in a database for determining which blocks of the video frame to be sent for future requests.

At step S1820, the server may determine, based on certain criteria, e.g., a field of view that determined at step S1814, whether there are any blocks of the video frame to be transmitted to the user device. When the field of view is determined by the video editor, especially for the first-time requested content, metadata may be used to carry information representing a predetermined field of view. When the server determines that there are at least some of the blocks of the video frame are to be transmitted to the user device, the process proceeds to step S1812. If the server determines that there are no blocks of video frame are to be transmitted to the user device, the process proceeds to step S1866. For example, in a video game, when a game character of a user has no equipment to see anything in a blackout room (a scene shown by the video frame), the server may determine that no content portion of the video frame should be sent to the user device.

At step S1822, the server may check the access request, which includes data representing a user device ID, from the user device to identify the user device who requests the content.

At step S1824, the server may receive and retrieve a vision profile of the user of the user device from the user device. As discussed above, when the user's vision profile shows that the user's vision exceeds a predetermined threshold, the server may unicast an additional enhancement layer applied to the area of focus of the user to the user device. By doing so, the resolution of the user's area of focus may be increased. When the user's vision profile shows that the user's vision is below a predetermined threshold, the server may determine not to transmit blocks representing video content that might not be seen by the user, because of his lower vision profile.

At step S1826, as discussed above, when the server determines that the requested content includes non-video content, e.g., audio content, associated with the video content, the server may retrieve information (e.g., metadata) of the audio and video content for dynamically adjusting, for transmission, bandwidth allocation between the video content and the audio content (details have been discussed in the description of FIG. 14). Alternatively or in addition, as discussed above, the server may retrieve metadata provided by the video editor for dynamically adjusting, for transmission, field of view and area of focus (e.g., FIG. 9). In some embodiments, step S1826 may be affected by step S1824 since when the user's vision allows the server not to transmit certain video blocks to the user, the server may allocate more bandwidth to the audio content.

At step S1830, the server may determine whether the CC is turned on by the user device.

When the server determines that the CC is turned on by the user device, the process proceeds to step S1832. At step S1832, when the CC is turned on and the CC content is not embedded in video content (as shown in FIG. 16), the server may identify video blocks that are covered by CC content. As such, the server may determine to omit these identified video blocks in step S1850 which will be described later. In other cases which are not shown in FIG. 18, when the CC is embedded in video content as shown in FIG. 15, the server may identify blocks $B''_{9,2}$, $B''_{10,2}$, $B''_{11,2}$, and $B''_{12,2}$ which include CC content.

As previously discussed, if the user watching 3D content and makes a sudden movement, the server may temporarily disable the 3D effect to minimize disorientation. In step S1840, the server may determine whether it has received an indication that the user has made such a movement, or that a 3D effect should be temporarily disabled, and if so, then in step S1842, the server may store information indicating that this is to be done for the subsequent frame. When the server receives data indicating that such movement is complete, the server may re-enable the 3D effect.

At step S1850, the server may determine blocks that can be omitted during the transmission of the video frame. As discussed above, for a 360 degree video frame, when a user is wearing a VR headset, the field of view may change depending on the viewing direction of the user. The server may determine blocks outside of the field of view are not to be delivered to the user device. In some examples, the blocks that are not to be delivered to the user device may be blocks that are disposed 180 degrees the opposite of where the user is looking (e.g., directly behind the user or an opposite focal point), and blocks surrounding that opposite point. In addition, as discussed in step S1832, the blocks obscured by non-embedded CC (as shown in FIG. 16) may be omitted during the transmission.

At step S1852, if multiple user devices request the video content, based on the retrieved data indicating multiple areas of focus of the users of the multiple user devices, the server may determine an aggregate area of focus for the users of the multiple user devices as discussed above. At step S1854, as discussed above, the server may determine a subset of blocks disposed within or overlapping the aggregate area of focus (e.g., FIG. 13).

At step S1856, when multiple user devices request the video frame, the server may determine blocks of the video frame to be included in baseline multicast streams at a baseline resolution for multicasting to all user devices. The blocks to be multicast to all user devices may include all blocks of the video frame, or alternatively, blocks disposed within or overlapping all the fields of view of the multiple user devices and optionally additional blocks surrounding the fields of view of the multiple user devices (e.g., FIG. 10).

At step S1858, the server may determine the blocks to be applied with enhancement layer(s) for an increased resolution. In some examples where multiple user devices request the video frame, the server may determine to apply an enhancement layer, for multicasting to all user devices, to blocks disposed within or overlapping the aggregate area of focus. The server may determine to apply a respective enhancement layer, for unicasting to a respective user device, to additional blocks disposed within or overlapping a respective area of focus of a user of the respective user device. In some other examples where a single user device is requesting the video frame, the server may determine to apply an enhancement layer, for unicasting to the single user device, to blocks disposed within or overlapping the area of focus of the single user.

At step S1860, based on results of steps S1856 and S1858, the server may create multicast streams at the baseline resolution and create enhancement layers for the targeted blocks.

At step S1862, the server may multicast the baseline multicast streams to the user devices identified in step S1822. The server may multicast enhancement layers created in step S1860 to user device(s) requesting the content.

As noted above, in some cases where the user device is reported to be a DVR in step S1812 and the server receives data indicating that the DVR is recording the content while no one is watching, the server may infer the aggregate area of focus determined based on all of the areas of focus of the other users, determine which block(s) to be omitted for transmission based on the aggregate area of focus, determine subset of blocks for aggregate area of focus, determine content for the baseline multicast stream and content for enhancement multicast stream based on the aggregate area of focus, create the multicast streams, and deliver the video frame along with an enhancement layer applied to the aggregate area. In these cases, step S1852 is performed before step S1852 may switch order.

At step S1864, as discussed above, the server may update the bitrate versions for each block by deleting certain bitrate versions based on the statistical data transmitted from the user devices at step S1816 (e.g., FIG. 13).

At step S1866, as discussed in FIG. 13, when the statistical data indicates that a bitrate version of a block has received a percentage of users' attention that is lower than a minimum required percentage, the server may determine that this bitrate version of the block may be deleted from the storage of the server and be moved to and stored in a storage of a higher level of server. In some examples, the server may determine that a block itself may be deleted from the storage of the server and be moved to and stored in a storage of a higher level of server when the statistical data indicates that this block has not been requested or transmitted to any user devices.

At step S1868, the server may delete the bitrate version of a block or a block itself based on the determinations of step S1866. As noted above, however, these blocks may be retrieved from a higher level server if the blocks are by a user in the future.

At step S1870, the server determines whether the video frame that has been transmitted to the requested user device(s) is the last frame in the request content. If the video frame is the last frame, the process ends at S1880. Otherwise, the process goes back to step S1810 for processing the next video frame.

It should be understood that the steps in the flow diagram illustrated in FIG. 18 need not all be performed in the order specified and some steps may be omitted, changed in order, or performed simultaneously. In one example, steps S1812 to S1818 may be performed in different orders. In another example, step S1840 may be omitted if only 3D version of the video content is provided to the user devices. In another example, the partitioning may be done in a real-time, e.g., partitioning a video frame upon the video frame being requested for access, and thus the step S1804 may be performed after step S1808.

It should also be understood that the description of the aforementioned figures can detail some steps shown in FIG. 18.

Additional alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A method comprising:
 receiving, by a computing device, information indicating an area of focus of a user viewing video content;
 positioning closed captions in the video content near an edge of a field of view that is based on the area of focus, wherein:
  a first portion of the video content, containing the area of focus, is encoded at a first quality;
  a second portion of the video content, containing the closed captions, is encoded at a second quality, lower than the first quality; and
  a remainder of the video content outside of the first portion and the second portion, is encoded at a third quality that is lower than the first quality and higher than the second quality; and
 sending the video content comprising the positioned closed captions.

2. The method of claim 1, further comprising moving the closed captions in the video content based on movement of the area of focus of the user.

3. The method of claim 1, wherein the information indicating the area of focus of the user comprises information indicating an area of focus during a previous viewing of the video content.

4. The method of claim 1, further comprising:
 sending, to a user device associated with a second user, the video content comprising the closed captions positioned near the edge of the field of view.

5. The method of claim 1, wherein the video content comprises immersive video content, and wherein the information indicating the area of focus is based on a field of view, of the user, within the immersive video content.

6. The method of claim 1, wherein the positioning the closed captions comprises positioning the closed captions at a location overlapping the edge of the field of view.

7. The method of claim 1, wherein the positioning the closed captions comprises positioning, based on the field of view of the user, the closed captions at a fixed position within the field of view.

8. The method of claim 1, wherein the area, in which the closed captions are positioned, is an aggregate area of focus based on a plurality of areas of focus of a plurality of users.

9. The method of claim 1, wherein the third quality comprises a bitrate that is lower than the bitrate of the first quality and higher than a bitrate of the second quality.

10. The method of claim 1, wherein the third quality comprises a resolution that is lower than a resolution of the first quality and higher than a resolution of the second quality.

11. A method comprising:
 receiving, by a computing device, information indicating a first area of focus that is:
  encoded at a first quality;
  associated with a first user; and
  in a partitioned video frame that also comprises a plurality of blocks that are encoded at a second quality that is lower than the first quality;
 embedding closed captions in a subset, of the plurality of blocks, based on the first area of focus, wherein the subset is encoded at a third quality that is lower than the second quality based on the closed captions being embedded in the subset; and sending, to a first user device associated with the first user, the subset comprising the closed captions.

12. The method of claim 11, further comprising:

receiving second information indicating a second area of focus, associated with the first user, in a second partitioned video frame comprising a second plurality of blocks, wherein the second area of focus is different from the first area of focus;

embedding second closed captions in a second subset, of the second plurality of blocks, based on the second area of focus and the first area of focus; and sending, to the first user device, the second subset comprising the closed captions.

13. The method of claim 11, further comprising:

receiving a second version of the subset, of the plurality of blocks of the video frame, without the closed captions, wherein the second version of the subset is encoded at the second quality based on the second version of the subset not comprising closed captions.

14. The method of claim 11, wherein the partitioned video frame comprises a partitioned immersive video frame, and wherein the information indicating the first area of focus is based on a field of view, of the first user, within the partitioned immersive video frame.

15. The method of claim 11, further comprising determining the subset from a portion of the plurality of blocks outside of the first area of focus.

16. The method of claim 11, wherein the first area of focus is a common area of focus based on a plurality of areas of focus associated with a plurality of users.

17. A method comprising:

receiving, by a computing device, information indicating an area of focus of a user viewing video content;

positioning closed captions in a first portion of the video content that is based on the area of focus; and encoding portions of the video content using three qualities:

wherein the area of focus is encoded at a first quality;

wherein the first portion; is encoded at a second quality lower than the first quality; and wherein a second portion, comprising the area not in the area of focus or the first portion, is encoded at a third quality that is lower than the first quality of higher than the second quality.

18. The method of claim 17, further comprising sending the video content comprising the positioned closed captions.

19. The method of claim 17, wherein the second portion is a second version of the first portion that does not comprise the closed captions; and sending, to a user device, based on whether closed captions are on for the user device:

the first portion, encoded at the second quality, based on closed captions being on for the user device, or the second portion, encoded at the third quality, based on closed captions not being on for the user device.

20. The method of claim 17, wherein the positioning the closed captions comprises positioning the closed captions based on a perceived depth of an object in the area of focus.

* * * * *